H. HASTINGS.
BUTTON TURNING MACHINE.
APPLICATION FILED MAR. 27, 1909.
1,152,315.
Patented Aug. 31, 1915.
11 SHEETS—SHEET 1.
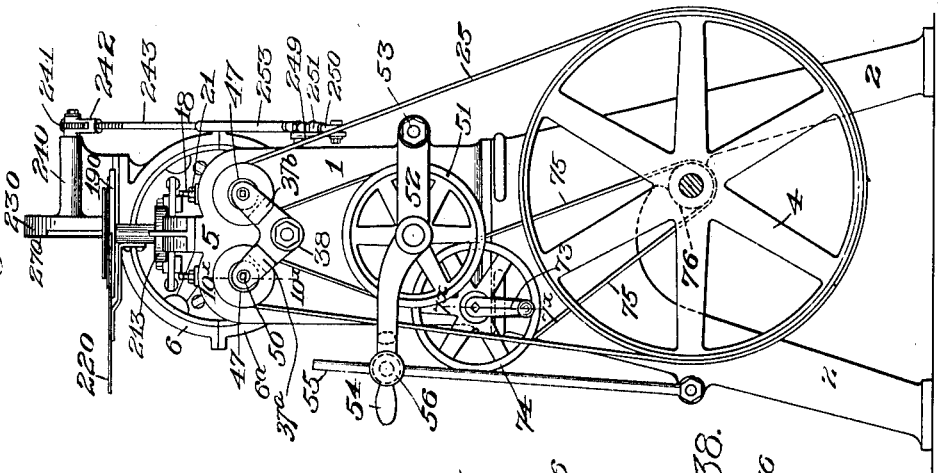
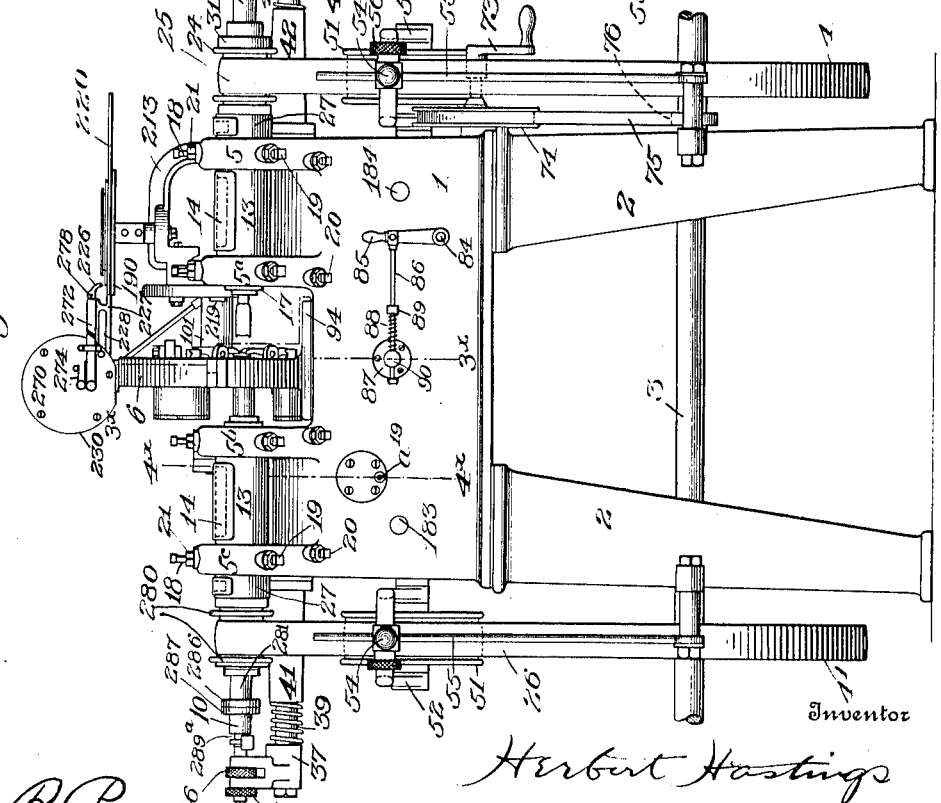
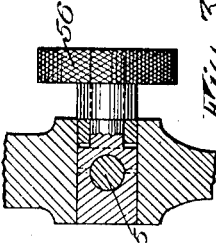
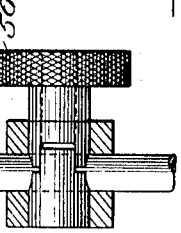
Witnesses
Walter B. Payne
Nelson Cobb
Inventor
Herbert Hastings
By Church & Rich
His Attorneys

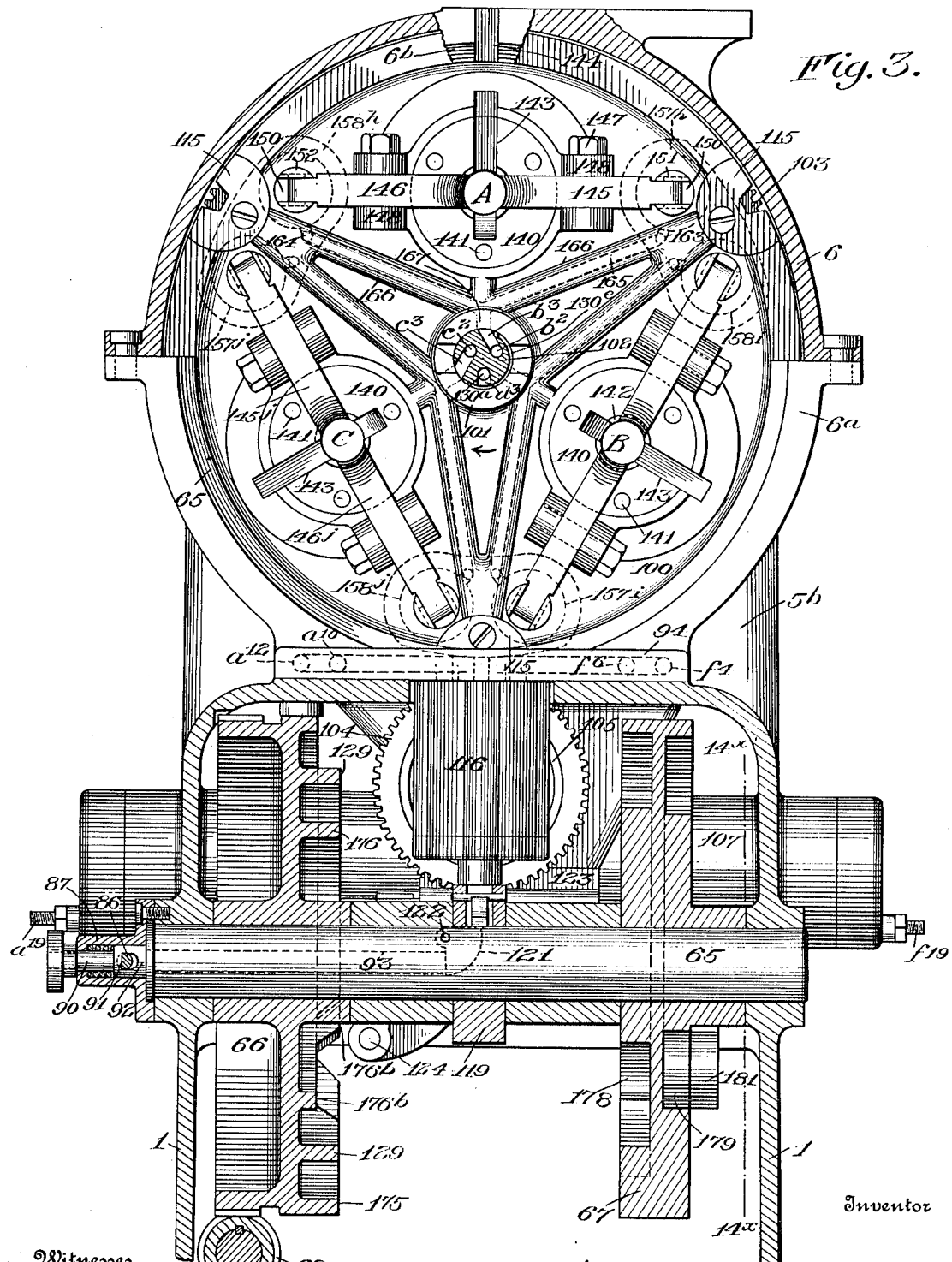

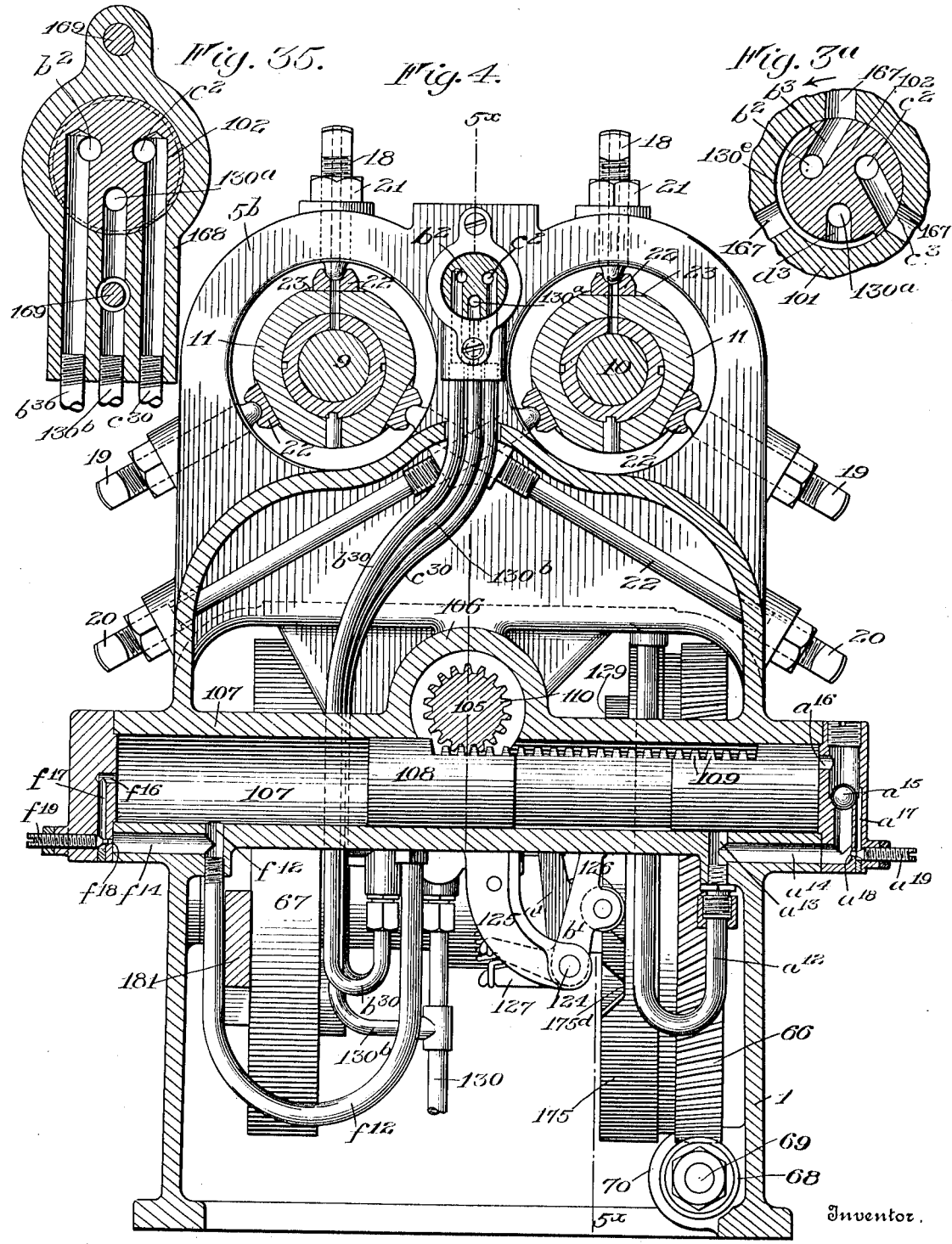

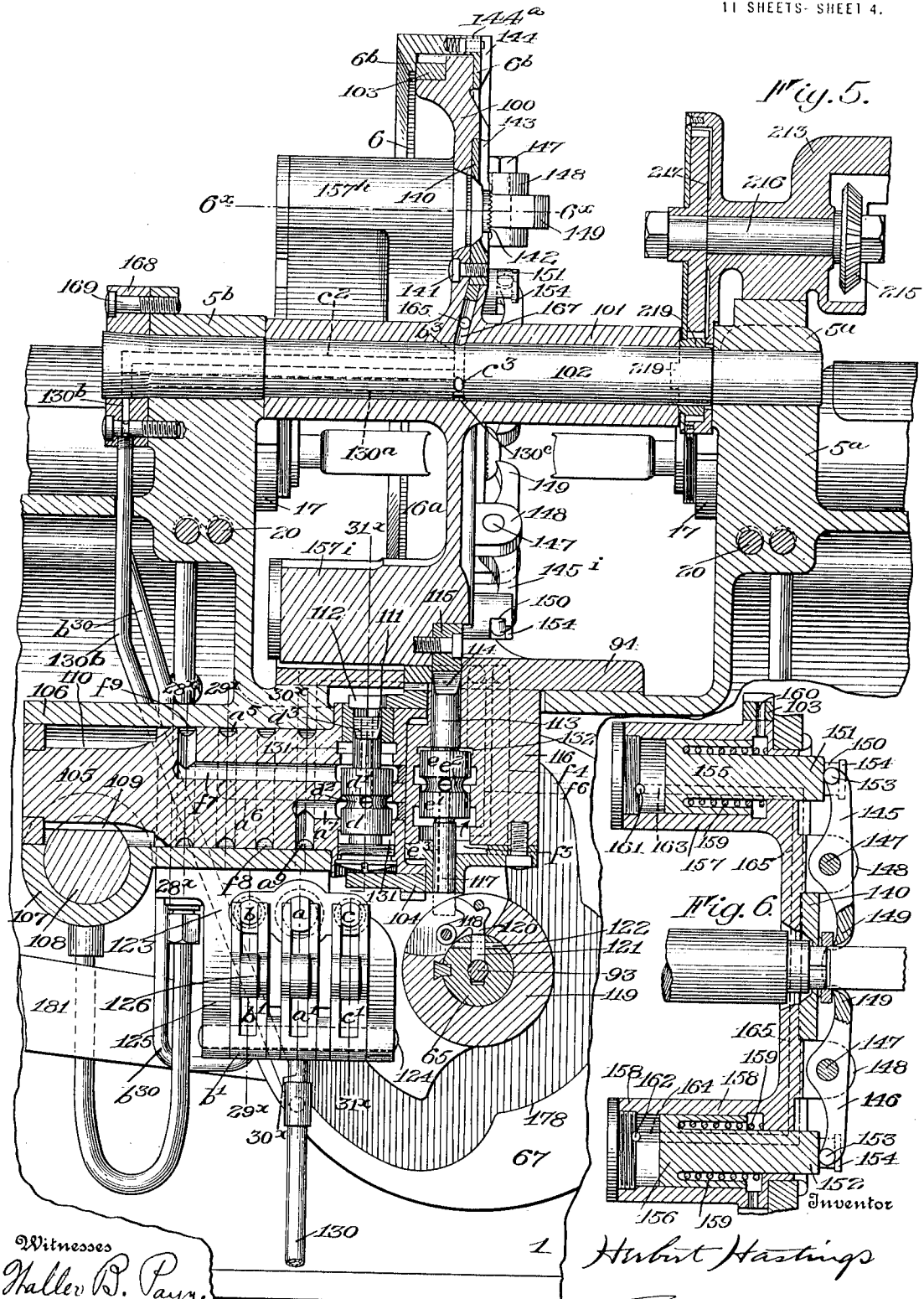

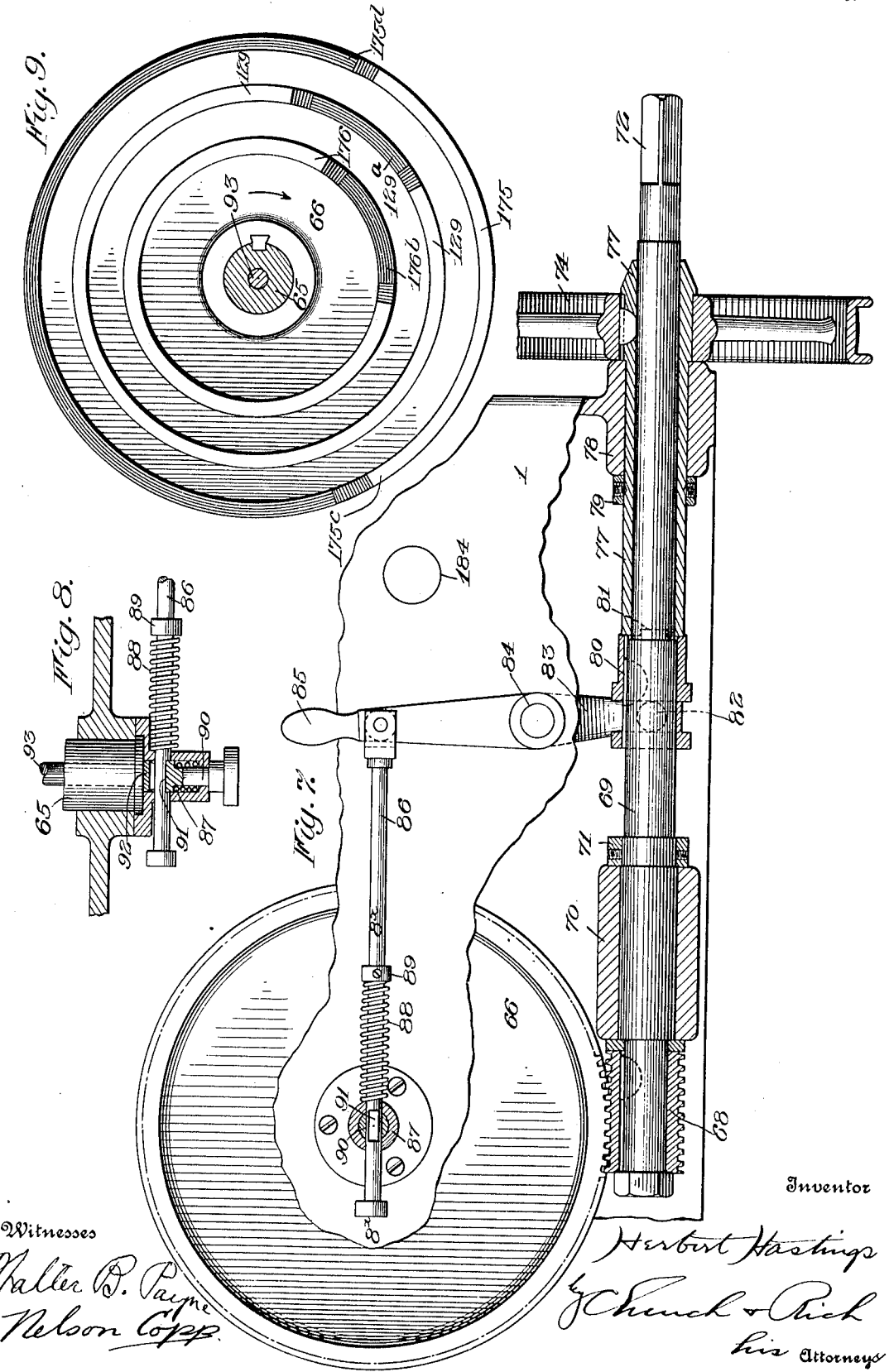

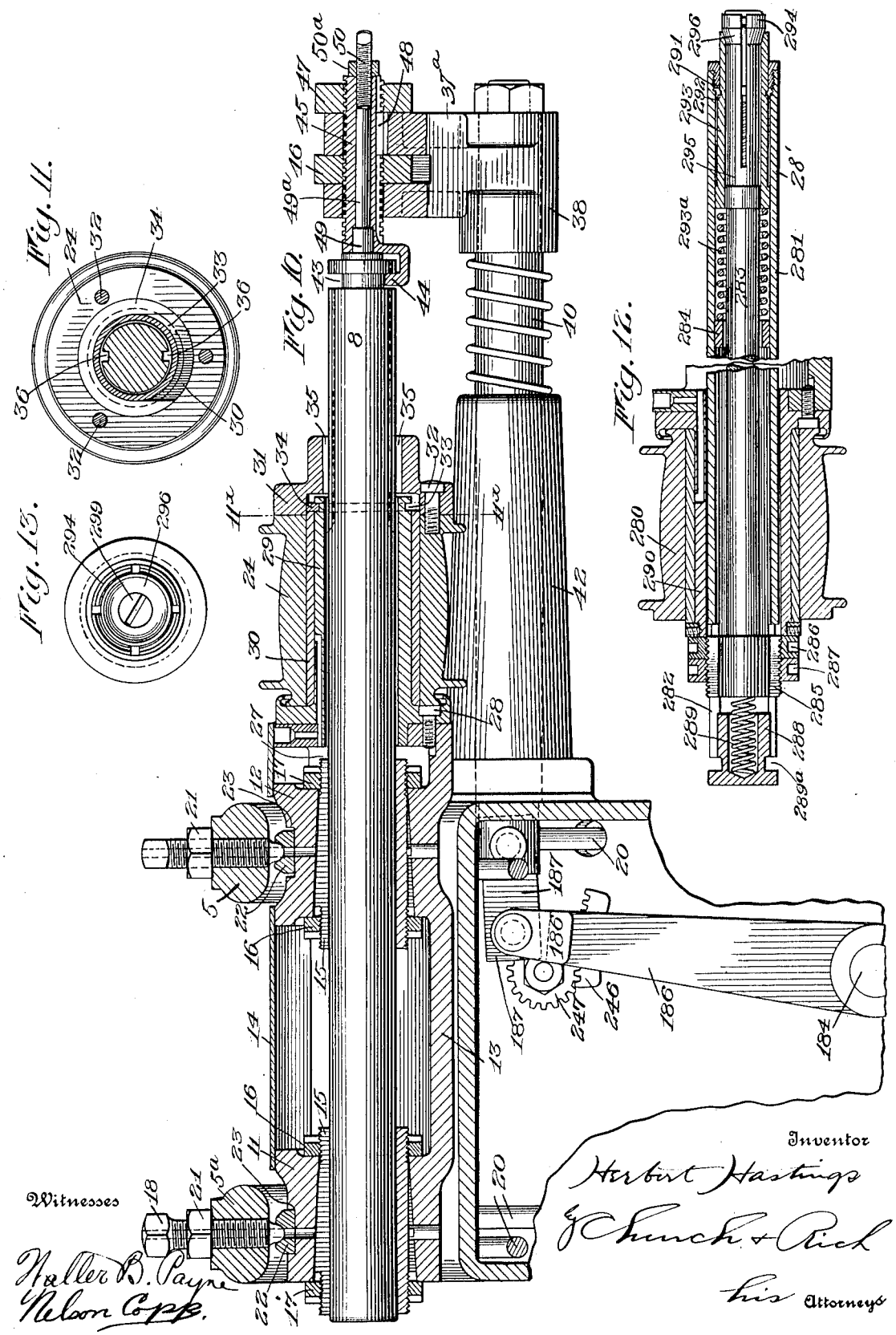

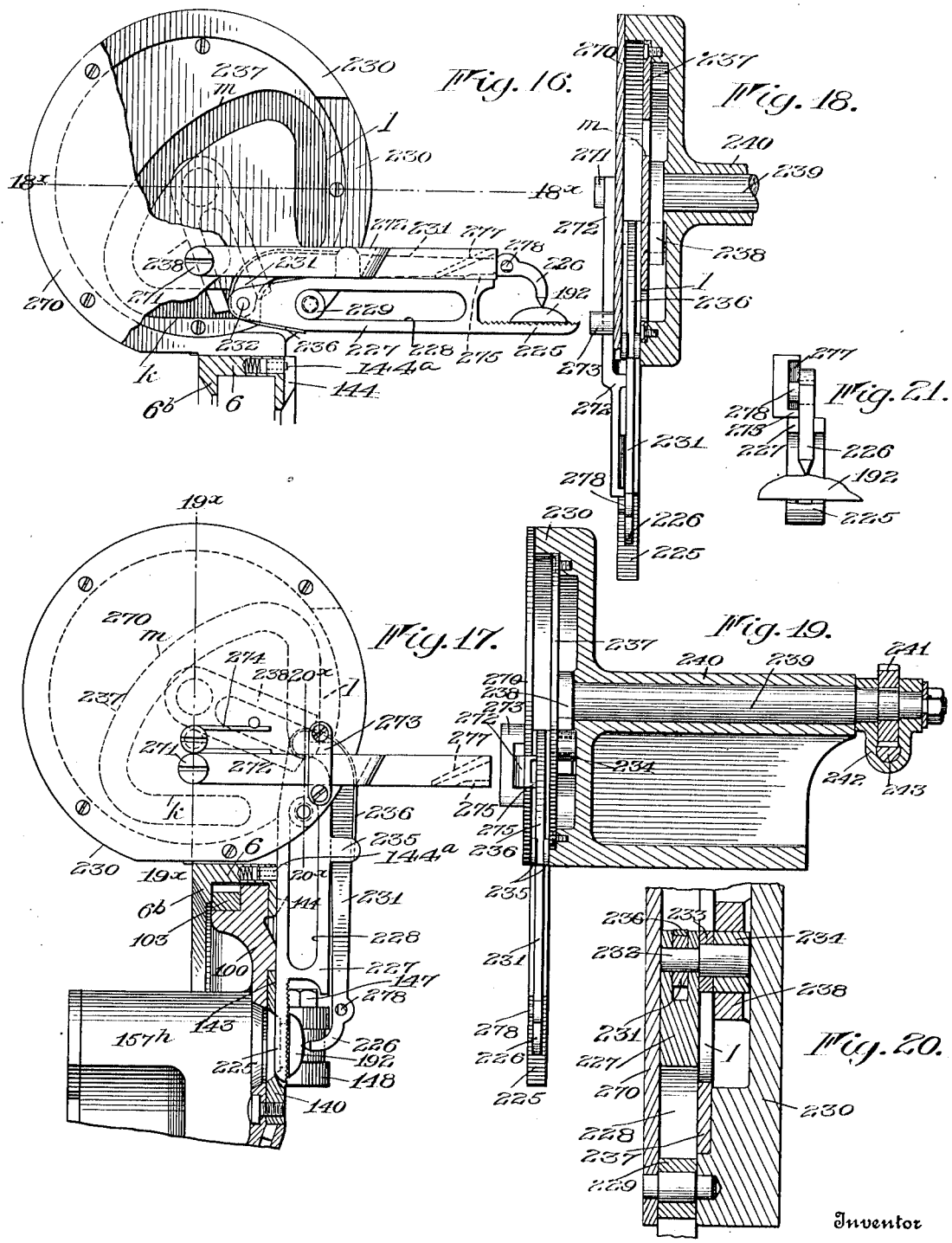

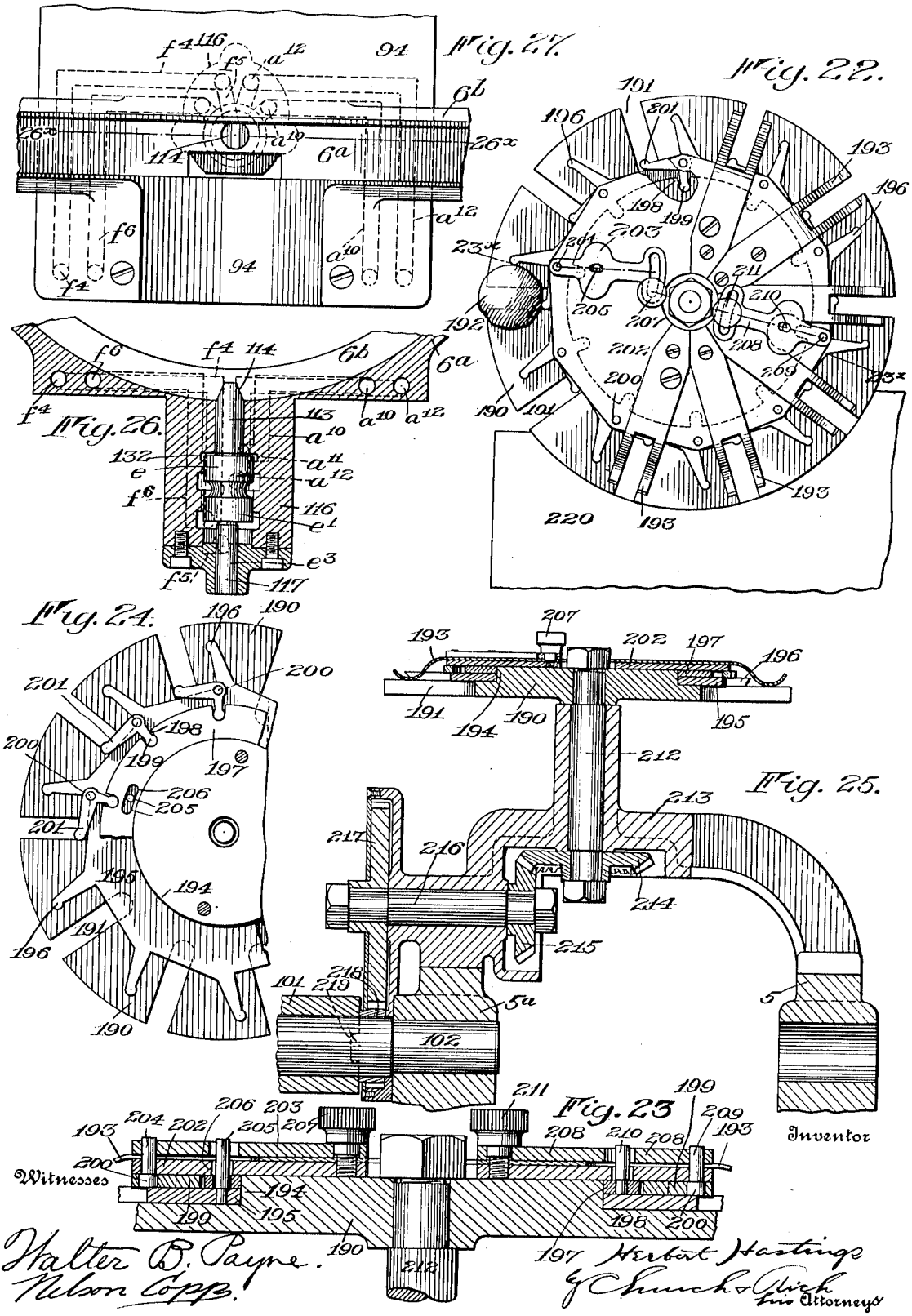

H. HASTINGS.
BUTTON TURNING MACHINE.
APPLICATION FILED MAR. 27, 1909.
1,152,315.
Patented Aug. 31, 1915.
11 SHEETS—SHEET 9.
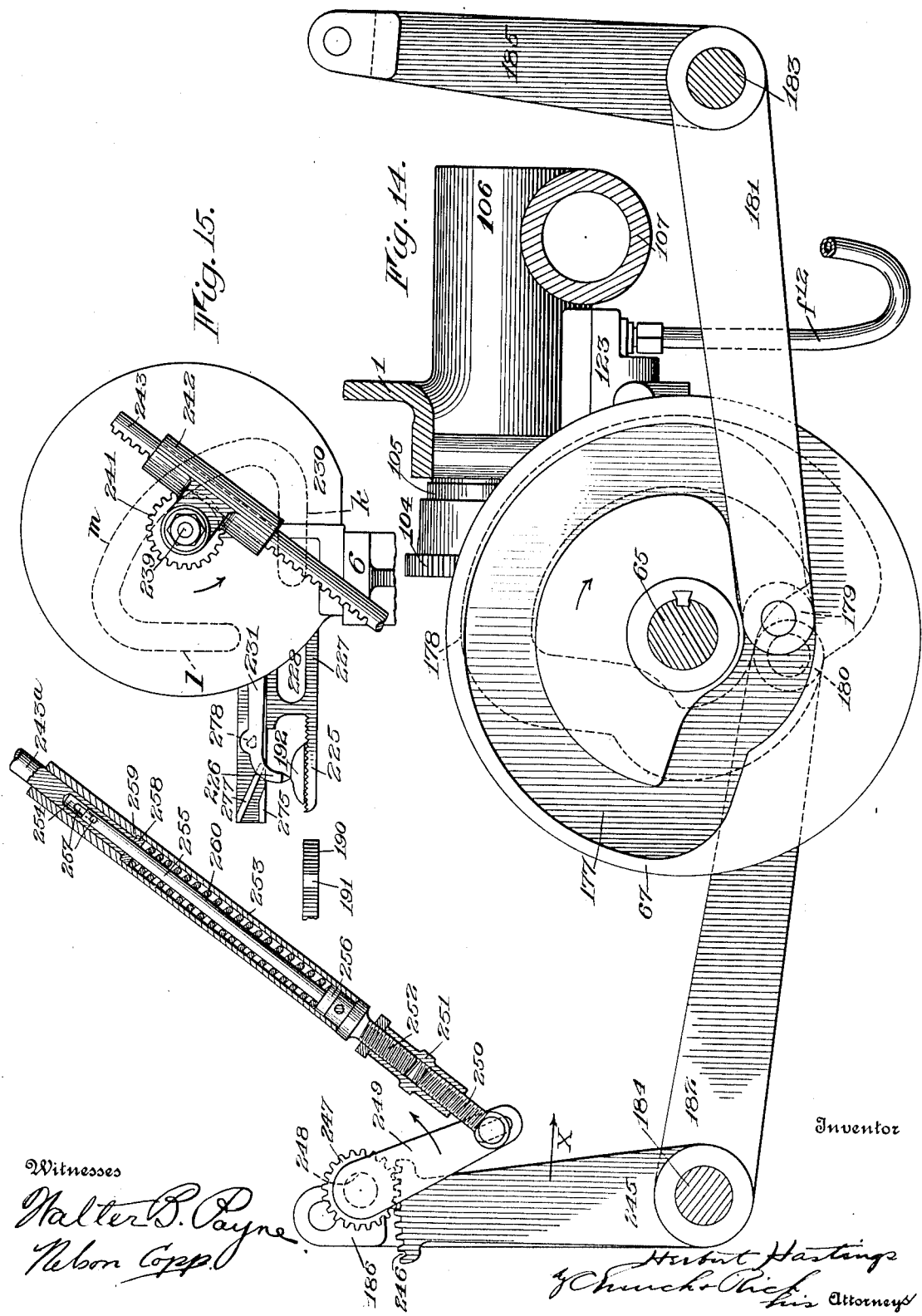

H. HASTINGS.
BUTTON TURNING MACHINE.
APPLICATION FILED MAR. 27, 1909.
1,152,315.
Patented Aug. 31, 1915.
11 SHEETS—SHEET 10.
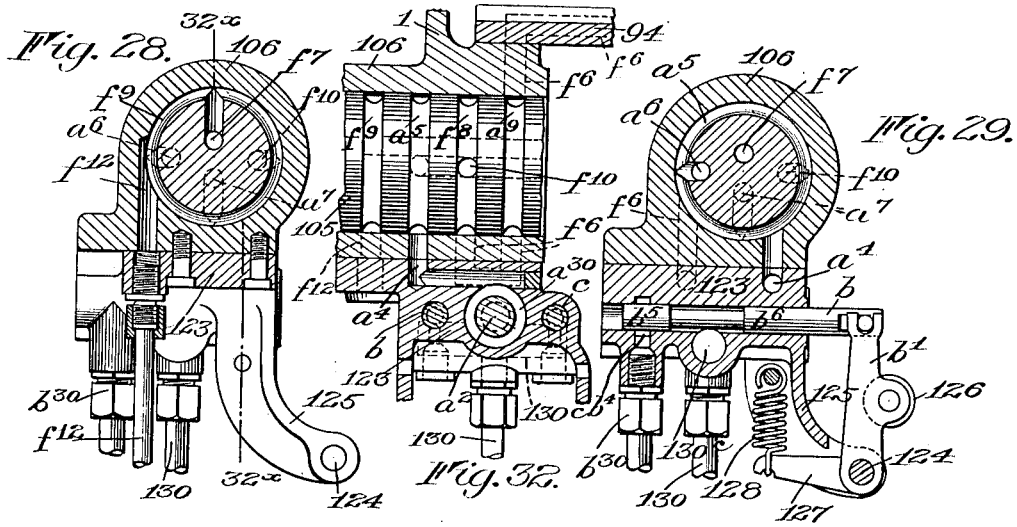
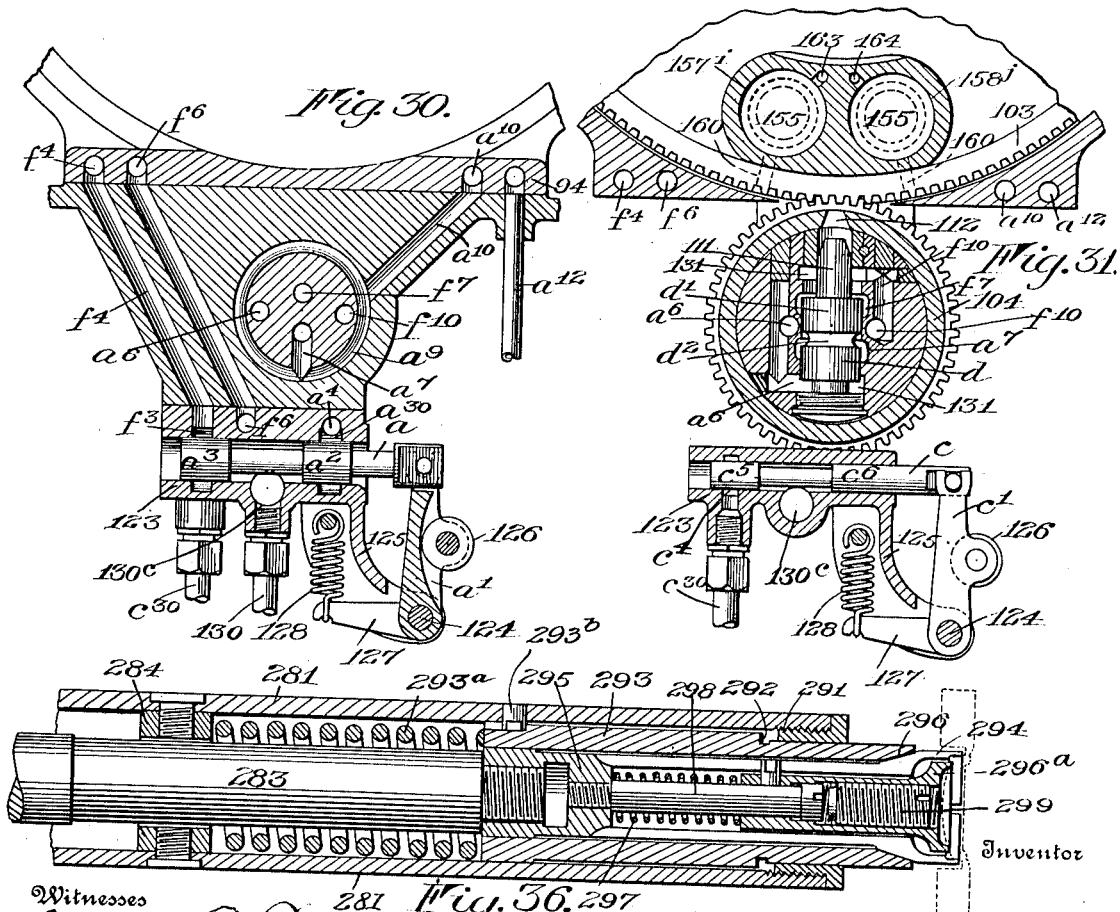
Witnesses
Walter B. Payne
Nelson Copp
Inventor
Herbert Hastings
By Church & Rich
his Attorneys

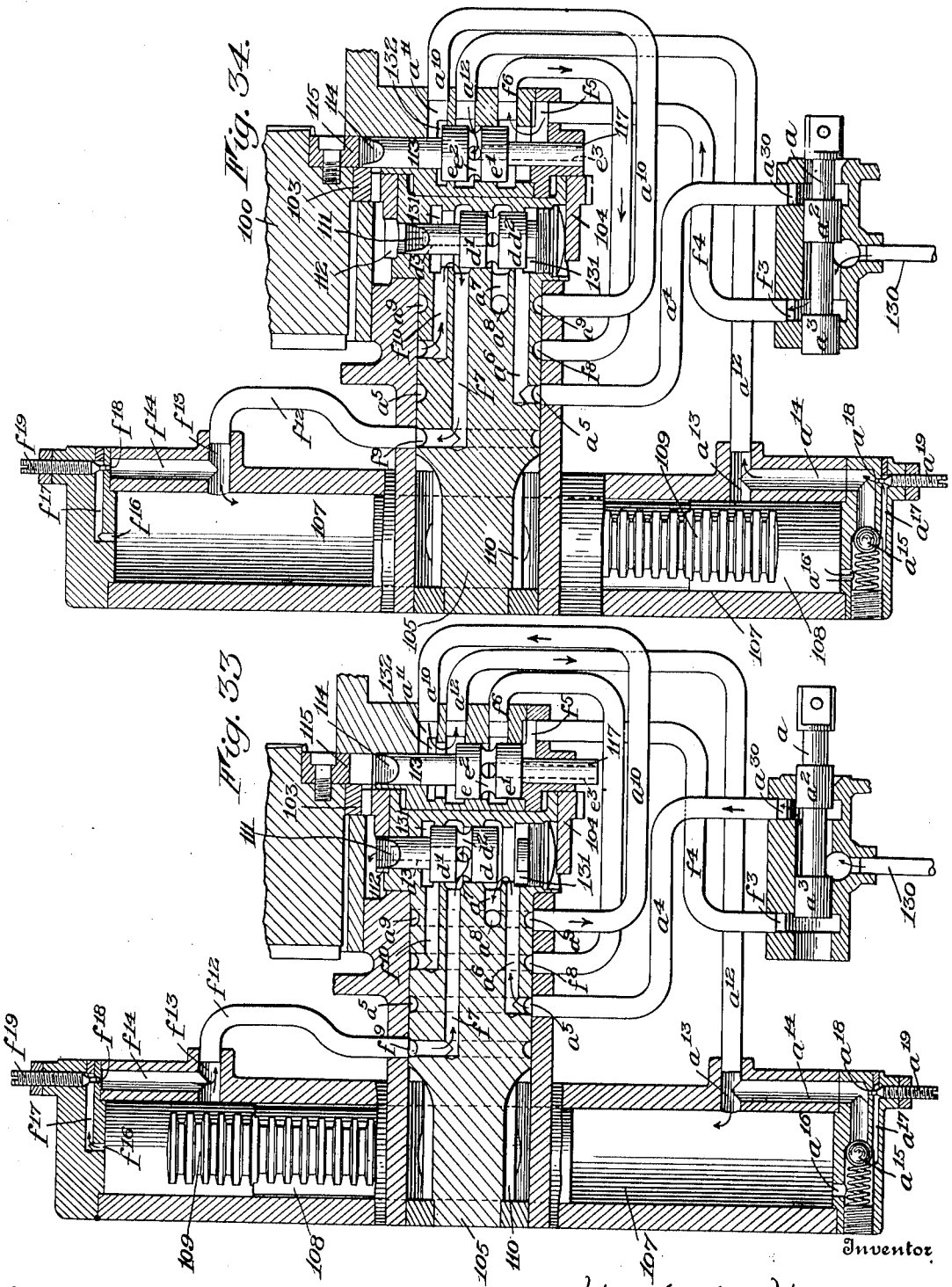

UNITED STATES PATENT OFFICE.

HERBERT HASTINGS, OF ROCHESTER, NEW YORK, ASSIGNOR TO GERMAN AMERICAN BUTTON COMPANY, OF ROCHESTER, NEW YORK, A CORPORATION OF NEW YORK.

BUTTON-TURNING MACHINE.

1,152,315.  Specification of Letters Patent.  Patented Aug. 31, 1915.

Application filed March 27, 1909. Serial No. 486,154.

*To all whom it may concern:*

Be it known that I, HERBERT HASTINGS, of Rochester, in the county of Monroe and State of New York, have invented certain new and useful Improvements in Button-Turning Machines; and I do hereby declare the following to be a full, clear, and exact description of the same, reference being had to the accompanying drawings, forming a part of this specification, and to the reference-numerals marked thereon.

My present invention relates to button turning machines and particularly to that class in which the buttons are cut and shaped from blanks by the successive operations of a plurality of tools and it has for its object to provide a machine of this character which will automatically perform all the various operations, including the feeding of blanks to the work piece holders, the successive presentation of the latter into position to receive the blanks and successively carry them to the tools employed for cutting and forming finished buttons and the final discharging of the buttons and the waste portion of the blank.

My invention also comprehends a machine for automatically operating upon blank work pieces in which the conjoint operation of the parts are controlled either pneumatically or by means of fluid other than air, under pressure, whereby its parts may be made small in size, compact and caused to operate in perfect timed relationship to each other.

In addition to the foregoing general features, my invention also includes the arrangement and association of the several parts of the mechanism, such as the means for indexing or timing their various relative operations and so controlling them that failure to properly position the work pieces or blanks in front of the tools will automatically disconnect the driving devices of the machine to prevent damage or injury occurring to any of its parts.

To these and other ends the invention consists in certain improvements and combinations of parts all as will be hereinafter more fully described, the novel features being pointed out in the claims at the end of the specification.

In the drawings: Figure 1 is a side elevation of a machine constructed in accordance with my invention. Fig. 2 is an end view thereof. Fig. 3 is a detail vertical sectional view taken on the line $3^x$—$3^x$ of Fig. 1, showing an enlarged front elevation of the turret on which the work pieces are carried during the successive operations to which they are subjected. Fig. $3^a$ is a detail section of the turret shaft. Fig. 4 is an enlarged vertical section view taken on the line $4^x$—$4^x$ of Fig. 1. This illustration shows two of the cutter spindles, the means for adjusting them and the driving member by means of which the turret is operated. Fig. 5 is a sectional view extending transversely through the turret, showing the devices for rotating it intermittently, said view being taken on the line $5^x$—$5^x$ of Fig. 4. Fig. 6 is a detail view taken on the line $6^x$—$6^x$ of Fig. 5, illustrating the arrangement and operation of the grippers of the work piece holders and the pistons operating them. In this figure are also shown the ends of the tools coöperating with a work piece in a holder. Fig. 7 is a fragmentary detail view showing the timing shaft, the index cam driven thereby and the devices for automatically disconnecting said parts, capable of either manual or automatic operation. Fig. 8 is a detail sectional view of the disconnecting devices taken on the line $8^x$—$8^x$ of Fig. 7. Fig. 9 is a face view of the index cam showing the relative positions of the several cam rings thereon. Fig. 10 is a longitudinal sectional view taken on the line $10^x$—$10^x$ of Fig. 2, showing one of the cutter spindles and the associated mechanism for reciprocating it. Fig. 11 is a detail sectional view of one of the tool driving pulleys taken on the line $11^x$—$11^x$ of Fig. 10. Fig. 12 is a view similar to Fig. 10 showing the details of the button extracting chuck and spindle. Fig. 13 is an end elevation of the chuck shown in Fig. 12. Fig. 14 is a detail view taken on the line $14^x$—$14^x$ of Fig. 3. This figure of the drawing illustrates the levers for imparting the longitudinal movement to the cutter spindles, the cams for operating the levers, also the connecting rod for actuating the blank transferring mechanism. Fig. 15 is a rear elevation of the blank transferring mechanism which is operatively connected with the parts shown in Fig. 14. Fig. 16 is a front elevation of said blank transferring mechanism, the parts being shown in the position to engage a work piece. Fig. 17 is a similar view showing the gripping devices of said mechanism in position to deposit the work piece in one of the holding devices on the turret. Fig. 18 is a sectional view taken on the line 18ˣ—18ˣ of Fig. 16. Fig. 19 is a sectional view on the line 19ˣ—19ˣ of Fig. 17. Fig. 20 is an enlarged detail view taken on the line 20ˣ—20ˣ of Fig. 17. Fig. 21 is a front elevation of the picking fingers of the transferring mechanism. Fig. 22 is a plan view of the work piece feeding table. Fig. 23 is a horizontal sectional view thereof taken on the line 23ˣ—23ˣ of Fig. 22. Fig. 24 is a detail fragmentary view of the feeding table illustrating particularly the arrangement and operation for centering the work pieces. Fig. 25 is a detail vertical sectional view showing the feeding table and the driving devices by which it is rotatably connected with the turret. Fig. 26 is a horizontal sectional view showing a detail of the turret guard taken on the line 26ˣ—26ˣ of Fig. 27, and Fig. 27 is a plan view of the parts shown in Fig. 26. Figs. 28, 29, 30 and 31 are detail sectional views taken on the lines 28ˣ—28ˣ, 29ˣ—29ˣ, 30ˣ—30ˣ and 31ˣ—31ˣ respectively of Fig. 5, illustrating the various air passages and valves controlling them, which serve to control the intermittent operation of the turret and the proper opening and closing of the several gripping devices thereon. Fig. 32 is a similar view on the line 32ˣ—32ˣ of Fig. 28. Fig. 33 is a diagrammatic view showing the positions assumed by the various parts of the turret operating mechanism immediately after each movement of the turret. Fig. 34 is a similar view illustrating the return movement of the turret operating piston during the dwell of the turret. Fig. 35 is a detail end view of the check block showing the passages therein which communicate with those in the turret spindle. Fig. 36 is an enlarged detail view of the backing tool and chuck, shown in section, and Figs. 37 and 38 are detail views showing the lock employed for securing the belt tightener pulleys in adjusted positions.

Similar reference characters in the several figures indicate similar parts.

A machine embodying my invention and adapted for turning buttons comprises the button turning tools, for performing what is known as the rough cutting and finishing operations on the blank which are arranged at opposite sides of the devices for carrying and holding the work piece or blank during the cutting operations to which it is subjected. These tools are arranged to be operated relatively toward and from the button blank holding devices at predetermined intervals of time in accordance with the movements of other parts of the machine.

The cutting tools are mounted in spindles and the latter are supported in an adjustable journal box whereby opposing tools, such as the roughing cutter for roughly cutting the front of the button and the roughing and finishing cutter for forming the rear of the button, may be accurately alined. These spindles are operated longitudinally in their journal boxes by reciprocating heads operated toward and from each other by means of suitable cams which revolve continuously and in order that the depth of the cut of the tools may be accurately determined, adjustable connections are provided between the outer ends of the reciprocating heads and the spindles, in which the tools are carried, as shown in Fig. 10. There are four of these tool spindles arranged in pairs, one of each pair being located at each side of the center of the machine. The first pair of spindles carry tools for rough cutting the face of the button and for rough cutting and finishing the rear of the button. Of the remaining pair of spindles, one carries a tool for finishing the face of the button and the other is provided with a chuck or gripping device such as shown in Fig. 12 for extracting the button while it is being severed from the surrounding ring of the blank by the action of the last mentioned finishing tool.

The devices for holding and carrying the work pieces or button blanks during the several operations to which they are submitted during the formation of the buttons, comprise in the present instance a revoluble head or turret, as shown in Fig. 3 having thereon a plurality of sets of gripping devices or work piece holders which are automatically operated to secure the button blanks when these are placed in operative position and to finally release the ring or annulus when the completed button has been severed and removed therefrom. In the present instance there are three sets of work piece holders and the turret operating mechanism is so designed and constructed that the turret is rotated intermittently to present each of said holders successively into operative position between the two pairs of cutter spindles. There are always two work pieces undergoing simultaneous operation by the pair of tools, consequently the third holder at this time is at rest in a position to receive a new work piece.

Arranged above the turret are the feeding devices such as shown in Figs. 1 and 16 to 21 inclusive. The present embodiment of the invention, in this respect comprises a pair of fingers which select or pick off the work pieces from a revoluble feeding table, shown in Figs. 22 and 25, which are then retracted and rotated through an angle of approximately 90 degrees and moved downwardly to insert the blank in the holder on the turret which is at that time idle with its jaws or grippers in an open position to receive the work piece. The feeding table is located at one side of the turret as shown particularly in Fig. 1, and is operated intermittently step by step each time a blank is removed therefrom to position another blank in readiness to be withdrawn by the fingers.

The mechanism for rotating the turret is preferably operated pneumatically as are also the jaws of the work piece holders, although of course fluid other than air under pressure may be employed if so desired. The operation of these devices is timed or controlled by indexing mechanism which also governs the movement of the cutter spindles as well as the rotation of the work piece feeding table and the fingers employed for transferring the blanks from the latter to the holders on the turret.

The button turning machine as a whole, illustrated in side and end elevations in Figs. 1 and 2, comprises the main frame 1 supported upon a suitable base or legs 2 on which may be mounted the driving shaft 3 provided with driving pulleys 4 and 4'. Extending upwardly from the main frame are brackets 5 and 5ª, arranged at the right hand side of the turret case 6, and similar brackets 5ᵇ and 5ᶜ, located at the left hand side thereof. The first mentioned pair of brackets support the bearing boxes for the spindle, for the rough cutting facing tool and the spindle 8, as shown in Fig. 1, for the face finishing tool, while the brackets 5ᵇ and 5ᶜ support the spindles 9 and 10 (Figs. 4 and 1) arranged respectively to receive the rough cutting back finishing tool and the button holding tool or chuck shown in Fig. 12. These bearing supporting brackets and the spindle bearings mounted in each, are similar in construction and a detail description of one of these parts is applicable to all.

Each of the brackets is provided with two apertures as shown in Fig. 4 in which the respective spindles and their bearings are positioned. These bearings comprise the inner and outer boxes 11 and 12, connected by a cylindrical web 13 which is provided with an aperture in its upper side, covered by a removable plate or cap 14. Each of the boxes is tapered and fitting therein are the journal boxes 15 which are split lengthwise and are held in position by adjusting nuts 16 and 17, whereby they may be positioned longitudinally in their respective boxes and adjusted to compensate for any lost motion or wear. Coöperating with the bearing boxes of each shaft are the centering devices comprising three adjusting screws which are supported in the several brackets of the main frame. These screws are so disposed that they extend radially of the centers of the spindles and engage the boxes on which the latter are journaled at equidistant points about their circumference, as shown particularly in Fig. 4. The adjusting screws for the several boxes are arranged similarly in each of the brackets the uppermost or top screws, which are arranged vertically, being indicated by 18 while the side screws 19 and 20 are disposed at angles. The set screws 20 which support the inner sides of the bearing boxes project through the sides of the frame opposite to that nearest which the boxes are located, so that these screws are considerably longer than the others and are arranged at an angle or offset slightly so that their inner ends may pass each other as will be clearly understood from the illustration shown in Fig. 4. Each of the bearing screws is threaded in the frame and provided with a lock nut 21 and their inner ends or extremities are provided with semispherical points fitting similar shaped cavities in bearing blocks 22, the rear sides of which are flattened and rest in notches 23 formed on the exterior of the bearing boxes 11 and 12. The blocks engaging the box 11 are preferably prevented from lateral movement by being fitted snugly between the shoulders of the recesses while those engaging the box 12 are permitted a slight lateral movement, in order to permit the outer end of the spindle to be adjusted in any direction without in any way cramping the bearing blocks. However it will be understood that the angular adjustment of the outer ends of the spindles in reference to the frame of the machine is comparatively slight as it is only necessary that the spindles be adjusted to position them in perfect alinement with the opposing spindle carrying the complementary tool.

Each spindle is rotated by a driving member or pulley 24 those at the right hand end of the machine being rotated by a belt 25 passing around the pulley 4 while those at the left hand end thereof are rotated by the belt 26 driven by the pulley 4'. The pulleys 24 are supported on bearings formed as extensions of the spindle bearing boxes so that the pull of the belt, which might have a tendency to spring the spindles as well as to exert an influence to cause them to wear their bearings unevenly and thus permit the spindles to get out of alinement, is eliminated. The construction by which this advantageous arrangement of the parts is obtained is best shown in detail in Fig. 10 in which it is seen that the casting comprising the bearing boxes 11 and 12 and the connecting web 13 is provided with an extension 27 to which is removably attached, by means of screws 28, a hub or sleeve 29 surrounding the spindle but preferably not engaging the latter. The pulley 24 is provided with a journal box 30 which fits the sleeve 29 and at its outer end is a cover or cap piece 31 detachably connected by screws 32 and provided with an internal recess receiving the end of the sleeve 29 which is provided with a circumferential groove 33 for retaining a U shaped locking collar 34. The latter is held in place by the inner side wall of the recess in the cap or cover and when the latter is in proper position, the pulley is prevented from outward movement thereon by said collar. The cover or cap piece 31 is also provided with two keys 35 which lie in the grooves or keyways 36 provided in the opposite sides of the spindle.

The spindles at each end of the frame are moved longitudinally by reciprocating heads 37 and 38 mounted on the outer ends of the slide rods 39 and 40 supported in the guides 41 and 42 at opposite ends of the main frame 1. Each of these reciprocating heads actuate the spindles with which they are associated simultaneously, and as the rods are located centrally beneath the spindles, their heads are provided with diverging arms 37$^a$ and 37$^b$, as shown in Fig. 2, which carry the connections by means of which the spindles are adjusted relatively to the heads. These connections are shown in detail in Fig. 10. The outer end of each spindle is grooved as indicated at 43 and lying therein is the hook shaped extremity 44 of the threaded tubular adjusting bolt 45 which may be operated longitudinally relatively to the head 38 in either direction, by means of a nut 46 and secured by clamping nut 47. The bolt 45 is provided with a keyway and prevented from rotating in its supporting arm by a key 48. Arranged in one end of the bolt is a bearing piece 49 of fiber having an enlarged inner end abutting the end of the spindle and adapted to be adjusted relatively thereto by a bolt 50 threaded in the outer end of the bolt 45 and bearing against the end of a thrust rod 49$^a$ and secured by a lock nut 50$^a$. The parts 49—49$^a$ and 50 are made in separate pieces but in operation they act as a single member for adjusting the shaft in one direction. By this arrangement of parts, it will be seen that the spindles may all be adjusted so that the tools carried thereby will cut into the blanks on which they operate a given predetermined distance, while the movement of the reciprocating heads remains the same and as any lost motion between the spindles and the heads may be taken up by the adjusting devices, the tools can be positioned to perform their work accurately.

Arranged beneath the spindle pulleys are devices for tightening the belts 25 and 26, each of which comprises a pulley 51 around which the belts pass, said pulleys being supported upon arms 52, pivoted to the main frame, as indicated at the point 53. At their outer ends the arms are provided with the handles 54 which may be adjusted upwardly or downwardly and secured to rods 55 by means of the clamping bolt 56, the details of the latter being shown in Figs. 36 and 37.

*Timing or indexing mechanism.*—The main frame 1 of the machine is hollow and arranged therein is the mechanism controlling the rotation of the turret, the reciprocation of the tool spindles and the conjointly operating button blank feeding devices. Extending transversely of the main frame 1 at about the central point thereof, is the indexing cam shaft 65 carrying at its forward end the indexing cam 66 and at its rear end, the cam 67 employed for controlling the reciprocatory movement of the cutter spindles. Motion is transmitted to the indexing shaft 65 by the cam 66 which is provided on its circumference with spiral gear teeth meshing with the pinion or worm 68 mounted on the shaft 69 (Fig. 7). The latter extends lengthwise of the main frame and is supported in a bearing box 70 in which its longitudinal movement is prevented in one direction by the pinion and in the other by a collar 71, as shown in Fig. 7. The outer end of this shaft projects through the end of the main frame and is provided with a squared end 72 adapted to receive a crank arm such as 73 (Figs. 1 and 2) by means of which it may be rotated manually if at any time it is desired to adjust the parts in this manner. The shaft 69 constitutes the driving shaft and motion is imparted thereto by the driving pulley 74 revolved by belt 75 passing around the pulley 76 on the shaft 3. The pulley 74 is not however connected directly to the shaft but is mounted upon a sleeve 77 journaled in the box 78 and held against longitudinal movement therein by the pulley located at one end of the box and the collar 79 engaging the opposite end thereof. The sleeve 77 constitutes a driving clutch member with which coöperates the driven clutch member 80 splined to the shaft and movable longitudinally thereof and provided with one or more projections such as 81 which are adapted to fit in corresponding notches or depressions in the adjacent end of the sleeve 77. The sleeve 80 is also provided with an annular groove into which projects a pin 82 carried on the end of an operating lever 83 arranged within the frame 1 and attached to a stud 84, the end of which projects exteriorly of the main frame and is provided with the operating arm or handle 85 by means of which the driven clutch member may be engaged or disengaged from the driving member 77. Attached to the handle 85 is a rod 86 which is guided in a boss 87 arranged exteriorly of the main frame 1 and located in alinement with the center of the indexing shaft 65. The rod 86 is surrounded by a coil spring 88, arranged between the boss 87 and the collar 89, which is placed under tension when the handle 85 is moved to throw the clutch sleeves or members 80 and 77 into engagement as shown in Fig. 7. The rod 86 in this position is held, as shown in Fig. 8, by a spring operated bolt 90 engaging in a recess or depression 91 in said rod which is also provided with an inner end or part 92, adapted to normally abut the end of the shaft 65 in position to be operated outwardly, to release the rod 86, by the action of a thrust rod or bolt 93 arranged centrally in the shaft 65, the operation of which will be further described hereinafter. The arrangement of these parts is shown particularly in Figs. 3, 7 and 8.

*The turret mechanism.*—The support for the work pieces comprises a revoluble turret provided with work piece holders embodying gripping devices which form the means for carrying and placing the work pieces before the operating tools. The turret is constructed in the form of an annular plate surrounded by a casing composed of the upper and lower sections 6 and 6ª, the latter being provided with a base or foot piece 94 by means of which it is secured to the central table portion of the main frame 1 between the brackets 5ª and 5ᵇ. This casing is in the form of an open ring and at each edge it is provided with inwardly extending flanges 6ᵇ which embrace the edges of the turret plate. The latter is indicated by 100 and at its center, it is provided with a laterally extending hub 101 which is journaled on the stationary shaft 102, the ends of which are secured in the brackets 5ª and 5ᵇ, as shown particularly in Fig. 5. The turret plate is provided with equidistantly spaced apertures indicated by A, B, and C which represent the positions in which the button blanks are placed for the successive operations performed on them, position A being the receiving position, B the roughing position and C, the finishing and ejecting position. The several work piece holders or sets of gripping devices are similarly constructed but as somewhat different actions occur in connection with each of them as they are successively moved from one position to another, description of their construction and operation will be omitted until the mechanism for rotating the support or turret has been explained.

*The turret rotating mechanism.*—The work piece support or turret is automatically rotated through successive steps each an angle of 120 degrees and during the dwell between the steps the turret is held or locked in adjusted position by a suitable bolt 113 while the several tools are performing their respective operations. When these operations have been completed the bolt is retracted to permit the turret to be unlocked and allow it to be again rotated. The intermittent rotation of the turret continues indefinitely so long as its driving parts perform their proper functions and the rotary movement is not prevented, as sometimes may occur by a reduction in the fluid pressure supply or the lodgment of a chip between the turret and the frame. At such a time the clutch members 80 and 81 will be automatically disconnected by the release of the rod 86, as will be more fully explained hereinafter. To start the movement of the turret when it has been arrested, the operating handle 85 is moved toward the left, in which position it is retained by the bolt 90 engaging the recess in the rod 86. The driving element which rotates the turret is an oscillatory shaft moved by the reciprocating piston of a fluid operated engine, which is moved in opposite directions by air or other fluid under pressure admitted alternately to opposite ends of the cylinder in which the piston is located. As the turret is revolved continuously in one direction by successive partial rotations, an intermediate driving member is arranged between it and the oscillatory driving element or shaft and the latter is secured to the former, when moving in one direction, by means of a locking device or bolt which is ejected when the turret locking bolt is retracted. Both of these bolts are controlled by fluid in passages which are so arranged that the two bolts are interdependent in their operation.

The turret plate 100 is surrounded by a gear ring 103 and intermeshing therewith is a similar ring 104 of smaller diameter carried on the inner end of the oscillatory driving shaft 105 journaled in the hub or boss 106, formed on the main frame 1 and located directly beneath the turret, as shown particularly in Figs. 5, 33 and 34. Extending transversely of the main frame and beneath the outer end of the boss 106 is a cylinder 107 containing the piston 108 provided along its upper edge with rack gear teeth 109 which engage similar teeth 110 formed on the oscillatory member 105 by means of which the latter is rotated first in one direction and then the other by the reciprocatory movement of the piston. At the inner end of the member 105 is a transversely extending aperture or chamber in which is located the turret rotating bolt 111 having the outer wedge shaped end which is adapted to be projected into engagement with a notch 112 formed in the gear ring 104.

The turret locking bolt, indicated by 113, is provided at its outer extremity with a wedge shaped end 114 coöperating with the notches in the plurality of wear plates 115, adapted to receive it, said plates being provided at equidistant points about the circumference of the turret plate 100. The locking bolt 113 reciprocates in a chamber, formed in a casting 116 depending from the foot or base part 94 of the turret casing and in alinement with the boss 106. From an examination of Figs. 5 and 3, it will be seen that turret locking bolt 113 is located above and slightly to one side of the center of the indexing cam shaft 65 so that its lower end 117, when said bolt is retracted, as shown in dotted lines of Fig. 5, projects into the path of the release dog 118. The latter is pivotally supported in a recess in the collar 119 secured to the shaft 65. The release dog is provided with an end or finger 120 which bears against one face of a lever 121, the other face of which abuts against the end of the release rod 93. This lever 121 is arranged in a slot in the shaft 65 and is pivoted on the pin 122 so that it will be moved to eject the rod 93 to effect a disconnection of the driving mechanism, by permitting the clutch members 77 and 80 to be disengaged whenever the release dog engages the turret locking bolt by reason of the failure of the latter to be projected into the position shown in full lines in Fig. 5.

Beneath the boss 106 containing the oscillatory member 105 is secured a valve chest 123 (Figs. 5 and 29 to 32) having passages formed therein and provided with valve chambers in which reciprocate piston slide valves $a$, $b$, and $c$ which are controlled by levers $a'$, $b'$ and $c'$ pivoted on an arbor 124 supported at its ends in bracket arms 125. Each of the levers is provided with a small roller 126 which coöperates respectively with the cam rings of the indexing cam 66, as will be more fully described hereafter. Each of the valve lever arms is provided with a rearwardly extending finger 127 to which is connected a retractile spring 128 which serves to move the valve operating lever in one direction and to hold its roller 126 in operative engagement with its respective cam ring as shown in Figs. 29, 30 and 31.

In the actual construction of a machine of this character the various air passages are formed in the different frame pieces either by drilling out the metal or providing cored apertures in the castings. In the drawings the exact location of these passages have been shown but in order to simplify the description and to enable an understanding of the operation of the machine to be more easily understood, the passages controlling the operation of the turret rotating mechanism have been shown in separate diagrammatic illustrations, Figs. 33 and 34. The flow of the fluid in these passages is controlled by the piston slide valve $a$.

The indexing cam Fig. 9, is provided upon its inner face with the three cam rings of which the center one is provided with the normal portion 129 and the operating or depressed part $129^a$ which for a comparatively brief portion or part of the rotation of the cam allows the valve lever $a'$ to move outwardly to position the valve $a$, as shown in Fig. 33 in which position it remains until the turret has been rotated the required distance, when the portion of the cam 129 moves the lever and restores the valve $a$ to the position shown in Fig. 34. Air or other fluid under pressure is supplied to the valve chest through the pipe 130 from which it enters the chamber between the heads $a^2$ and $a^3$ of the piston slide valve $a$. When the latter is in the position shown in Fig. 33 the valve head $a^2$ opens the port $a^{30}$ permitting air to then enter the passage $a^4$. The latter communicates with the annular groove $a^5$ of the oscillatory shaft 105 and communicating with this groove is a longitudinally extending passage $a^6$ leading to one end of the piston chamber 131, at a point beneath the lower end of the turret-rotating-bolt 111 which latter has the two heads $d$ and $d'$. These two heads are separated by an annular passage $d^2$ from which leads the exhaust port $d^3$, shown in dotted lines in Figs. 33 and 34. The admission of air through the passages $a^4$ and $a^6$ into the lower end of the chamber 131 forces the turret-rotating-bolt upwardly until its piston head $d$ passes the port at the end of the passage $a^7$ which in turn is connected by a transverse passage $a^8$, in the shaft 105, with the circumferential groove $a^9$ thereof. Communicating with said groove is a pipe or passage $a^{10}$ which connects with the port $a^{11}$ at the upper end of the chamber 132 containing the turret locking bolt 113. The latter is similar in construction to the turret-rotating-bolt, just described, and comprises two piston heads $e$ and $e'$ separated by an annular groove $e^2$ from which leads an exhaust passage $e^3$, shown in dotted lines in the diagrammatic illustrations. The air under pressure impinging upon the piston head $e$ retracts the turret locking bolt into the inoperative position, as shown in Fig. 33, at which time said piston head opens the port from which leads the passage $a^{12}$, connected to the port $a^{13}$ near the forward end of the cylinder 107. It is through this port, and the by-passage connected therewith, that the fluid pressure is supplied to actuate the piston 108 in the direction in which it moves when rotating the turret plate 100.

In Fig. 33 the piston 108 is shown at the rear end of the cylinder in the position which it occupies at the completion of the rotation of the turret but it will be understood that at the commencement of its movement to rotate the turret the piston is at the forward end of the cylinder as shown in Fig. 34. The port $a^{13}$ is then cut off and fluid enters the cylinder by way of the passage $a^{14}$ opening the ball check valve $a^{15}$ and passing into the cylinder by way of the port $a^{16}$. In connection with the passage $a^{14}$ and check valve arranged therein, it will also be noticed that there is another small passage $a^{17}$ communicating with the port $a^{16}$ and leading around the check valve to a port $a^{18}$ and forming a by-pass, the area of which may be adjusted by a needle valve $a^{19}$. At the opposite or rear end of the cylinder is found a similar arrangement of ports and passages indicated by $f^{13}$, $f^{14}$, $f^{16}$, $f^{17}$, $f^{18}$, $f^{19}$, the only difference being that the ball check valve is omitted, as the return movement of the piston may be permitted to be gradual as ample time therefor is provided while the turret is at rest. The port $f^{13}$ is alternately an inlet and an exhaust port and is connected by a passage $f^{12}$ with the annular passage $f^{9}$, in the oscillatory member 105 from which leads the internal longitudinally extending passage $f^{7}$ through which air from the rear end of the cylinder 107 is permitted to exhaust, when the turret-rotating-bolt has been projected into the position shown in Fig. 33, at which time said passage $f^{7}$ is in communication with the groove $d^{2}$ of the rotating-bolt piston head and the exhaust passage $d^{3}$ leading therefrom to the atmosphere. After each rotation of the turret, the parts come to rest in the position shown in Fig. 33 and it is then necessary to retract the turret-rotating-bolt 111 to disconnect the oscillatory member 105 from the gear ring 104, in order that the piston 108 may be returned to the forward end of the cylinder. In order to hold the turret rigidly in its adjusted position, after the rotating-bolt 111 is retracted as well as to hold it independently of the piston 108 and its connected parts, the locking bolt 113 is provided and the operation of this bolt and the rotating bolt before mentioned are made interdependent in their operation so that the rotating-bolt cannot be projected until the locking-bolt has been retracted and vice versa.

The indexing cam 66, Figs. 3, 7 and 9 rotates continuously and at about the time the piston 108 has completed its rearward movement (Fig. 33), the high or normal portion 129 of the central cam ring operates the lever $a'$ and moves the piston $a$ inwardly into the position shown in Fig. 34. The head $a^{3}$ of said piston opens the port $f^{3}$ into communication with the fluid pressure supply pipe 130. The port $f^{3}$ is connected by the passage $f^{4}$ with the port $f^{5}$ at the lower end of the chamber containing the turret-locking-bolt 113, beneath the head of the piston $e'$. The air pressure then causes the turret-locking-bolt to be ejected into the position shown in Fig. 34, the piston head $e'$ thereof opening communication from the port $f^{5}$ to the passage $f^{6}$, the other extremity of which is in communication with the annular groove $f^{8}$ in the member 105. Leading from the groove $f^{8}$ is a longitudinal passage $f^{10}$ which communicates with the chamber 131, containing the turret-rotating-bolt 111, above the piston head $d'$ thereof. The fluid pressure thus introduced to the last mentioned chamber causes the rotating-bolt 111 to be moved downward or into retracted position, as shown in Fig. 34, when said piston head $d'$ opens communication with the passage $f^{7}$. The fluid under pressure is then permitted to enter the rear end of the cylinder 107 through the passage $f^{12}$ and port $f^{16}$ to return the piston 108 into operative position. It will be noticed that when the turret-locking-bolt 113 is moved into operative position the passage $a^{12}$, leading from the forward end of the piston cylinder 107, is then open to the atmosphere through the groove $e^{2}$ and the exhaust passage $e^{3}$ to allow the escape of fluid during the return movement of the piston.

During the operation of the tools upon the work pieces carried on the turret the high or normal portion 129 of the intermediate ring of the cam 66 holds the piston $a$ inwardly in the position shown in Fig. 34 and during this time the fluid under pressure is permitted to move the piston 108 from its rearward position, shown in Fig. 33, to its forward position shown in Fig. 34, by traversing the following path:—supply pipe 130, port $f^{3}$, passage $f^{4}$, port $f^{5}$ (ejecting the turret-locking-bolt passage $f^{6}$, annular groove $f^{8}$, passage $f^{10}$ (retracting the turret-rotating-bolt) passage $f^{7}$, annular passage $f^{9}$, passages $f^{12}$, $f^{14}$, port $f^{18}$, passage $f^{17}$, port $f^{16}$. Air from the forward end of the cylinder 107 escapes through the port $a^{13}$, passage $a^{12}$, and exhaust passages $e^{2}$, $e^{3}$, for the major portion of the return movement of the piston 108, but after the forward end of said piston cuts off the port $a^{13}$, the air remaining therein seeps out of the cylinder by way of the port $a^{16}$, by-pass $a^{17}$, port $a^{18}$ into passages $a^{14}$, $a^{12}$ for the purpose of cushioning the piston. After the operations of the tools have been completed and they have been retracted the low portion $129^{a}$ of the indexing cam ring permits the valve $a$ to move outwardly, to the position shown in Fig. 33, permitting air to traverse the following path and to perform the following operations:—supply pipe 130, port $a^{30}$, passage $a^{4}$, annular groove $a^{5}$, passage $a^{6}$ (ejecting the turret-rotating-bolt) passages $a^{7}$ and $a^{8}$, annular groove $a^{9}$, passage $a^{10}$, (moving the turret-locking-bolt into retracted position) passages $a^{12}$, $a^{14}$, (depressing the check valve $a^{15}$) thence through passage $a^{16}$ into the forward end of the cylinder 107. The locking-bolt being retracted and the rotating-bolt projected, practically simultaneously, and before the movement of the piston 108 commences, releases the turret and locks the gear ring 104 to the oscillatory member or shaft 105 so that the rearward movement of the piston 108 causes the turret to be rotated or indexed. During the rearward movement of the piston 108, the air escapes from the rear end of the cylinder through the port $f^{13}$, passage $f^{12}$, annular passage $f^0$, longitudinal passage $f^7$ and exhaust passages $d^2$ and $d^3$, until the rear end of the piston closes the port $f^{13}$, after which its movement is cushioned by the retarded outflow of the air, then remaining in the cylinder, which must escape through the port $f^{16}$, by-pass $f^{17}$ and port $f^{18}$ into the passage $f^{14}$.

*The work piece holders.*—In illustrating the present embodiment of the invention three sets of work piece holders have been shown although it will be understood that a greater or less number of these may be mounted upon a suitable support if it is so desired. These holding devices are similar in construction and operation and each of them performs the same function as they pass successively into the receiving, rough cutting and finishing positions, indicated by A, B and C in Fig. 3. However, for greater convenience in description, some of the similar parts of the three holders will be designed by the exponents $h$, $i$, $j$ applied to the reference characters, as indicating the three different positions occupied successively by each holding device.

At equidistant points, indicated by A, B, and C, the turret plate is provided with apertures whereby the cutters or tools operating upon the rear sides of the blank may be projected through the said plate into engagement with the blank. Each of these apertures is surrounded by a ring plate 140 secured to the face of the turret 100 by screws 141 and provided at its inner edge with a raised knurled surface 142 adapted to engage the rear face of the button blank or work piece. This ring is also provided with a slot 143 extending radially of the turret plate which is adapted to register with a similar slot 144 provided in the arm $6^b$ of the upper part 6 of the turret casing for a purpose to be further described. The gripper jaws, indicated by 145 and 146, are pivoted on pins 147 carried in the ears 148 on the face of the turret plate. The proximate edges of the jaws are curved transversely to conform with the aperture in the plate 140 and are made talon shaped, as indicated by 149 in Fig. 6, to engage and rigidly hold a work piece against the plate 140 when they are moved into engagement with the work piece. The outer ends of these levers are fitted in slots 150 extending transversely of plungers 151 and 152 and are provided with laterally extending ears or projections 153, over which extend the small flanges 154 formed on the end of the plungers at each side of the slots therein.

As shown in Fig. 6, the plungers 151 and 152 project through the turret plate in line with the outer ends of the levers 145 and 146, and at the rear ends they are enlarged to form piston heads 155 and 156 which are inclosed in short cylinders 157 and 158. The rear sides of the piston heads are recessed to receive the coil springs 159 which normally operate to retract the pistons or plungers to move the gripper jaws 145 and 146 into inoperative or open position. Each of the cylinders 157 and 158 is provided with a vent 160 in rear of the piston heads which preferably lead through the gear ring 103, which is inclosed by the turret casing so that dust, grit, and other particles of foreign matter are not drawn into the cylinders. At the bottom of each of the cylinders are ports 161 and 162 from which lead air passages 163 and 164 communicating with the passage 165 formed in a rib 166 on the face of the turret plate 100, as shown in dotted lines in Figs. 3 and 6. The passage 165, at a point midway between its ends, is provided with a port 167 opening within the hub 101 of the turret. The shaft 102 on which the turret is journaled is provided with three longitudinal extending passages $b^2$, $c^2$ and $130^a$, the inner ends of which terminate in ports $b^3$, $c^3$ and $d^3$ arranged at the center of the shaft in position to coöperate with the port 167, of each set of gripping devices. At the end of the shaft 102, the three passages therein extend laterally and downwardly and register with separate passages in a cheek or distributing block 168 secured to the side of the bracket $5^b$ which for convenience in construction is made as a separate part and secured by screws 169. The end of the shaft 102 and the cheek block are taper fitted and in assembling the parts of the machine the cheek block is secured to the bracket $5^b$ before the shaft 102 is inserted, whereby the shaft may be driven lengthwise to secure it rigidly against rotation and form an air tight joint between the ends of the passages in the shaft and the connecting passages in the cheek block. This means of securing the shaft also permits it to be easily removed.

A constant pressure of air is maintained in the passage $130^a$ which is supplied by the pipe $130^b$ leading from the supply pipe 130 to one of the apertures in the cheek block 168, as shown in Fig. 5, and the admission of air to and its exhaust from the passages $b^2$ and $c^2$ is controlled by the valves $b$ and $c$. The respective chests in which said valves operate, are connected with the passages $b^2$ and $c^2$ by the pipes $b^{30}$ and $c^{30}$. On examination of the illustrations of these parts, as shown in Figs. 5, 35, 29, and 32, it will be seen that the pipe $b^{30}$ leads from the passage $b^2$ in the shaft 102 to the port $b^4$ in the valve chest of the piston slide valve $b$, Fig.

29, and that the pipe $c^{30}$ connects the passage $c^2$ with a similar port $c^4$ in the chest in which the valve $c$ operates. The chests containing the three valves $a$, $b$ and $c$ are arranged in proximity to each other in the same part or casting of the machine, as shown in the detail sectional view of Fig. 32, and the air or other fluid under pressure supplied by the pipe 130 is admitted to the chests of valves $b$ and $c$ by the laterally extending passage $130^c$. The valves $b$ and $c$ are each provided with the heads $b^5$, $c^5$ which normally close the ports $b^4$ and $c^4$ and said heads are connected by stems as shown, with outer heads $b^6$ and $c^6$.

The operation of each set of gripping devices as they pass successively from one position to another is controlled by the valves $b$ and $c$ which are operated by the inner and outer cam rings of the cam 66, the high and low portions of said cams being arranged relatively to the corresponding portions of the intermediate cam ring, which controls the valve $a$ so that each set of gripping devices is operated in the following manner during the intermittent movements or steps of the turret in making a complete rotation:—Upon the completion of the operation of forming the buttons which occurs when a work piece holder is in the finishing position C and after the tools have been retracted and while the holder is in position C, the valve $c$ is operated to permit the air to exhaust from the cylinders $157^j$ and $158^j$ (shown in dotted lines Fig. 3) so that the gripper jaws $145^j$ and $146^j$ are permitted to open to discharge the waste portion of the blank and to remain open when the turret is revolved to carry them into the receiving position A. These jaws in the receiving position stand in open position until the work piece or button blank has been deposited in them, then air is admitted to the gripper operating cylinders, which are at that time in the position indicated by $157^h$ and $158^h$, by the operation of the valve $b$. The turret still remains at rest momentarily after the grippers in the receiving position A have engaged the blank to allow the feeding fingers of the transferring mechanism, which position the blank, to be removed from proximity to the turret. During this interval of time the two sets of cutting tools have been advanced to operate upon the blanks located in the roughing and finishing positions B and C. After these tools are retracted then the turret is advanced, the cylinders of the gripping devices continuing to receive air through the passage $130^a$ while the cylinders are in the position indicated by $157^i$ and $158^i$. Upon the next successive movement of the turret, said cylinders are brought into the position indicated by $157^j$ and $158^j$ where air is supplied to them by the passage $c^2$, the pressure therein continuing until the finishing operation of the tools has been completed and the latter retracted whereupon the operation of the valve $b$ cuts off the supply of fluid and opens the passage $c^2$ to the atmosphere permitting the gripper jaws to be opened by the expansion of the springs 159.

In order to maintain the pressure of air in the gripper cylinders during the rotation of the turret from the receiving to the roughing position and from the latter to the finishing position, the passage $130^a$ communicates with a groove $130^e$ which extends part way around the shaft 102, as shown in Figs. 3 and $3^a$, the extremities of which terminate in proximity to the adjacent sides of the ports forming the extremities of the passages $b^2$ and $c^2$. The port 167, of the passage 165 leading to the gripper cylinders, is formed of sufficient width so that as the hub 101 of the turret rotates, said port 167 will in the first instance open communication between the groove $130^e$ and the passage 165 before it cuts off the port $b^3$ of passage $b^2$ and in the second instance, it will open communication with the port $c^3$ of passage $c^2$ before it cuts off the air admitted from the groove $130^e$.

By referring to the face view of the index cam, shown in Fig. 9, an understanding will be had of the relative arrangement of the high and low portions of the several cam rings thereon in reference to each other and also with reference to the intermediate cam ring which controls the indexing of the turret. In this figure it will be seen that the outer cam ring which controls the operation of the valve $b$, shown in detail in Fig. 29, is provided with a high portion 175 which moves the lever $b'$, to operate the valve $b$ inwardly to cause the valve head $b^5$ to open communication from the air supply pipe 130—$130^c$, through the port $b^4$ into the pipe $b^{30}$, thence into the passage $b^2$. The cam 66 rotates in the direction indicated by the arrow and the valve $b$ is operated by the high portion $175^c$ of the cam which is considerably in advance of the low operating portion $129^a$ of the intermediate cam ring, which it has been explained controls the operation of the valve $a$ and the rotation of the turret, so that the gripping devices in the receiving position A are closed somewhat in advance of the rotary movement of the turret. The low portion of this cam ring commences at the point marked $175^d$ which permits the valve $b$ to be moved outwardly at about the time the turret finishes its rotation. At this instant the valve arm $b'$ is permitted to move the valve $b$ outwardly so that its head $b^5$ uncovers the port $b^4$ opening the passage $b^{30}$ into communication with the atmosphere whereupon it will be seen that the gripping devices, previously released in position C, when passing into the receiving position A remain open as there is no air under pressure at this time in the passage $b^2$ and that fluid pressure is not admitted thereto until the valve $b$ has been again moved inwardly by the high portion $175^c$ of the outer cam ring.

The inner cam ring controlling the movement of the valve $c$, shown in Fig. 31, is provided with the high portion commencing at the point 176 for operating the valve $c$ inwardly to open communication between the air supply pipe 130—$130^c$, port $c^4$, passages $c^{30}$, $c^2$, to supply the latter with air under pressure during the rotation of the turret, and the transporting of a work piece holder from position B to position C. The part 176 of the cam also holds the valve $c$ in position to continue the supply of fluid pressure during the operation of the tools. When the latter have completed their work the low portion of this inner cam ring $176^b$ then permits the valve $c$ to be moved outwardly to open the passages $c^2$ and $c^{30}$ into communication with the atmosphere and allow the air in the gripper pistons to exhaust, when the annulus of the blank is discharged.

*Reciprocating the tool spindles.*—The cam 67 rigidly connected to the indexing shaft 65 is provided in its opposite faces with cam grooves 177 and 178 which are illustrated in Fig. 14, the groove 178 being shown in dotted lines. Resting in these respective grooves are rollers 179 and 180 carried on the ends of levers 181 and 182 pivoted within the main frame on studs or shafts 183 and 184, said levers also comprising crank arms 185 and 186. The last mentioned arms are connected at their upper ends by links 187 with the slide rods 39 and 40, of the reciprocating heads 37 and 38, as shown in detail in Fig. 10. The cam grooves 177 and 178 perform similar functions although they are not exact duplicates, the former being employed merely for advancing and retracting the tool spindles at the left hand end of the machine, shown in Fig. 1, allowing the spindles to remain in advanced position for a certain length of time to permit the cutting operations to be completed and the tools retracted before the rotary movement of the turret. Cam groove 178 is however so formed that the arms 182 and 186 are moved inwardly a short distance in the direction indicated by the arrow X in Fig. 14 and are then allowed to rest or dwell, during the rotation of the cam through an angle of about 80 degrees, during which time the turret is indexing or rotating. This dwell is provided in the cam 178 and the prior movement is transmitted to the arms 182 and 186 to perform one step in the operation of the transferring fingers of the work piece feeding devices during a portion of the inward movement of the tool spindles, at the right hand end of the machine portrayed in Fig. 1, and, for reasons to be further described, it is necessary that these transferring fingers be operated to select a blank from the feeding table and be thus arrested before they insert the blank in the work piece holder on the turret.

*The work piece feeding mechanism.*—Arranged in front of and above the turret and connected for rotation in unison therewith is the blank feeding table 190 to which the work pieces or button blanks, previously prepared and assorted, are supplied by an attendant and from which these blanks are withdrawn by the transfer fingers and conveyed to the holders or gripping devices on the turret.

The feeding table 190 (Fig. 22) comprises the base plate provided with equidistantly spaced notches 191 over which the centers of the blanks, such as 192, are placed and held by pressure of spring fingers 193. However, as it is desirable to properly position the blanks so that they may be accurately located with their centers above the slots in the plate, as well as with reference to the periphery of the latter, the table is provided with centering devices or spacers which may be adjusted in accordance with the size and character of the button blank stock to be operated upon. The central portion of the table is provided with an annular hub or shoulder 194 surrounded by a ring 195 having outwardly projecting gage fingers 196, located between the slots 191 in the table. Also journaled on the hub, above the plate 195, is a ring 197 provided with a plurality of notches 198 which receive the short arms 199 of small bell crank levers pivoted on pins 200 on the plate 202 at the base of each gage finger 196. The arms 201 of each of the bell crank levers extend laterally from their respective gage fingers across the slots 191 in the feeding table and are movable inwardly and outwardly to vary the distance between them and the edge of the table. Overlying the hub of the table and the ring 197 is a cover plate 202 and arranged thereon are two oscillatory adjusting arms $37^a$ and $37^b$ by means of which the plate 195 and the ring 197 may be rotated, the former to position the gage fingers 196 laterally relatively to the slots in the table and the latter rotated to move the fingers 201 inwardly or outwardly on the table. The member for adjusting the plate 195 is indicated by 203 which is pivoted at the point 204 and is provided with an elongated aperture into which extends a pin 205 projecting outwardly from the plate 195 through a slot 206 in the ring 197. The inner end of the member 203 is slotted and coöperates with a clamping screw 207. A similar lever 208 pivoted at point 209 coöperates with the pin 210 on the ring 197 to rotate the latter whereby all of the bell crank arms 201 may be simultaneously adjusted. This lever is also secured in operative position by clamping screw 211.

The feeding table is mounted in a horizontal position upon the upper end of a vertical shaft 212 journaled in a bracket 213 which is supported on the brackets 5 and 5ª of the main frame 1 and at its lower end the shaft is provided with a bevel pinion 214 meshing with a similar pinion 215 on the shaft 216. The latter is arranged centrally above the shaft 102 and carries the gear wheel 217 meshing with the pinion 218 rotatably supported on the shaft 102 and operatively connected with the hub 101 of the turret plate, a detachable connection being formed between these parts by providing one with a recess and the other with a coöperating projection 219 fitting therein, as shown in dotted lines in Figs. 5 and 25. The ratio between the several gear wheels employed for rotating the feeding table is such that the latter is advanced step by step a distance equal to the space between the notches 191 therein upon each movement of the turret. The progressive movement of the table 190 successively places the blank gaging devices thereon in discharging position so that upon each movement of the turret a new button blank will be positioned in readiness to be withdrawn from the table.

Arranged at one side of the feeding table 190 is a platform 220 on which a quantity of the button blanks may be retained. The surface of this platform lies in the plane of the upper face of the feeding table and its adjacent edge is curved and arranged in juxtaposition thereto so that the button blanks may be readily transferred from the platform into proper position on the feeding table and adjusted by the attendant beneath the springs 193 and in engagement with the gage fingers 196 and 201.

The mechanism for transferring the button blanks from the feeding table to the work piece holders is arranged centrally above the turret, as shown in Figs. 1 and 17, and is supported upon the turret casing. This mechanism comprises two coöperating picking fingers, indicated by 225 and 226, the former being adapted to project into the slots 191 of the feeding table beneath the button blank while the latter engages the upper surface of the blank within the slot in the end of its spring retainer 193. The finger 225 is arranged at the outer end of the flat plate or arm 227 provided with an elongated slot 228 within which is fitted a roller 229 journaled on the frame piece 230. The rear end of the arm 227 is slotted to receive the end of the arm 231 which curves upwardly and overlies said plate and terminates in the pointed finger 226. The arm 231 is pivoted on the stud 232 (Fig. 20) which also extends laterally and forms a journal for two rollers 233 and 234. Holding the arm 231 centrally on the arm 227 are the ears 235 and bearing against its upper surface is a spring 236 which is secured to the arm 227 and normally tends to move the pointed finger 226 toward the finger 225. As before mentioned these fingers after engaging a button blank, on the feeding table, are retracted in a horizontal direction and together they are rotated through the space between the table and turret which in the present instance is represented by an angle of about 90 degrees and are then moved downwardly to position the blank between the gripper jaws of the holder on the turret. This movement is effected by the conjoint operation of a cam track cut in the plate 237, secured within the frame piece 230, an oscillatory element of the machine which imparts movement to the transferring fingers and the slot 228 and roller 229. In Fig. 16 the cam slot is shown provided with a horizontal portion $k$, a vertical portion $l$ and the curved part $m$ which are traversed by the roller 233. The oscillatory driving member is located behind the cam plate 237 and comprises a slotted arm 238, the side portions of which embrace the roller 234. The arm 238 is supported upon a shaft 239 journaled in a hub 240 on the frame piece 230 and at its outer end is provided with a pinion 241 embraced between the arms of the sleeve 242, also journaled on the shaft 239 and forming a guide for a rack bar 243, as shown in Figs. 2, 15 and 19. The teeth of the rack bar are formed on a rod connected at its lower end by means of yielding tension devices with the operating mechanism by means of which oscillatory movement is imparted at the proper intervals of time to the driving member 238. These yielding tension devices and operating mechanism are illustrated in detail in Fig. 14. The stud or shaft 184 to which the levers 182 and 186 are connected is also provided with an arm 245 having a segmental gear 246 meshing with a pinion 247 supported on an arbor 248, journaled in main frame 1 of the machine, the outer end of which is arranged exteriorly thereof and is provided with a crank arm 249, as shown in Fig. 2, between which and the end 243ª of the rack bar are arranged the yielding tension devices. The latter are provided to compensate for any slight irregularities which may occur between the operation of the heavier and more massive parts of the machine and the more delicately constructed and accurately operating parts governing the movement of the transferring fingers. Connected to the arm 249 is a threaded member 250 coöperating with the turn buckle sleeve 251 which is also threaded on the stud 252 carrying a spring casing 253 the opposite extremity of which embraces the end 243ᵃ of the rack bar rod. The latter is provided with a longitudinal cavity 254 receiving the rod 255 provided with enlarged end 256 which normally engages the end of the stud 252. A short longitudinal movement is permitted between the rods 243 and 255 in one direction which is permitted by a slot and pin connection 257. The end of the rod 243 abuts a washer 258 which is held against a shoulder 259 in the sleeve 253 by means of a coil spring 260, one end of which bears against said washer while the other end engages the head 256. By this arrangement of parts it will be seen that if the arm 249 is moved slightly, after the transferring fingers have been brought to their limit of movement, the sleeve 253 may be drawn lengthwise of the rod 243, the shoulder 259 therein moving the washer 258 downwardly to compress the spring 260. However, on the other hand, if the arm 249 has a tendency to overthrow when it is moved in the opposite direction, the sleeve 253 may telescope on the rod 243 to compress the spring 260 between the head 256 and the washer 258, this movement being permitted by the slot and pin connection between the rods 255 and 243.

The parts arranged within the frame piece 230 are inclosed by a cover plate 270 and pivoted on the stud 271 thereon is an arm 272 which is held in position and permitted a slight tilting movement beneath a yoke 273 but is normally held depressed as shown in Fig. 17 by a spring 274. The outer end of the arm 272 is offset slightly and provided with a small lip 275 which is adapted to engage the upper edge of the arm 227 when the latter is brought into a horizontal position, as shown in Fig. 16. On the offset projecting end of this arm is an angularly disposed rib or cam track 277 with which coöperates a stud 278 on the arm 231.

The operation of the transferring fingers may now be clearly understood. Initial movement imparted to the arm 245, (Fig. 14) by the arm 182 when the latter commences its movement under the influence of the cam 178, rotates the pinion 248 and rocks the arm 249 upwardly in the direction indicated by the arrow. The movement thus imparted to the rack bar rotates the gear 241 and causes the slotted member 238 to move the transferring fingers backwardly, in a horizontal direction, along the part $k$ of the cam plate 237. This part of the movement retracts the ends of the fingers from the slots 191 of the feeding table causing them to extract or remove a button blank. As before explained, in connection with the cam 178, the period of dwell therein is provided to permit the rotation of the turret and when this is accomplished, one of the work piece holders thereon is in the receiving position A. The transferring fingers therefore remain at rest momentarily but as the cam 178 again commences to move the arms 182 and 245, the member 238 continuing its rotation, again imparts movement to the transferring fingers causing the roller 233 to traverse the part $m$ of the cam plate 237. By this action the transferring fingers are rotated about the roller 229, into a vertical position, as shown in Fig. 17, when they are depressed as the roller 233 moves along the part $l$ of the cam slot, to carry the button blank vertically downwardly beneath the clamping jaws 145 and 146 of the work piece holder. When in this position, the arm 227 projects into the slots 144 and 143 on the turret casing and the gripper ring where it remains until the cam 178 restores the arms 182 and 245. The coöperating fingers 225 and 226 are not separated after the blank has been gripped by the turret jaws, but are merely pulled away from the blank. The arms 227 and 231 when disengaging the blank first move vertically along the slot 143 in the face of the turret and the slot 144 in the turret casing and arranged in the latter is a small spring push pin 144ᵃ which tends to eject the lower end of the arm 227 at the time the roller 233 commences to traverse the sharp part of the curve in the cam slot at the upper end of the portion $l$ of said slot. The pushing out of the lower end of the arm starts the roller around the curve of the cam slot and materially assists the action of the feeding devices. It will be remembered from previous description that prior to the retraction of the cutter spindles, the gripper jaws of the holder when in the receiving position A are closed and that this interval of time is allowed to enable the transferring fingers to be withdrawn as the tools are moved outwardly away from the turret.

The reverse movement imparted by the rack bar 243 to the oscillatory driving member 238 restores the transferring fingers to their normal position and as they return into a horizontal plane, the finger 227 passes into engagement with the lip 275 on the bar 272. As these fingers are then again projected, the pin 278 on the arm 231 rides upon the cam 277 to elevate the finger 226 but permitting it to snap downwardly under the influence of the spring 236 into engagement with a new button blank on the feeding table when the fingers have reached their limit of outward movement.

*Backing and extracting the button.*—The tool which performs the last operation upon the button which is usually the one employed for providing the finishing cut on the outer or face portion of the button, also serves to sever the button from the blank or annulus and to accomplish this, said tool is provided with points or cutters at its edge which circumscribe the periphery of the button for severing the portion or web which remained to hold the button after the rough cutting tools had operated on the blank. It will readily be seen that unless the button is supported at the side opposite to which the finishing cutter is operating, the latter will have a tendency to break the web and force the button out of the blank before the web has been entirely severed, thus leaving the button with an irregular bur, which would be very objectionable and would necessitate the button being subjected to a further operation to make a perfect and marketable product. In order to obviate this difficulty I have provided a tool which is arranged in alinement with the tool which performs this finishing and severing operation and is so constructed that it engages the button and forms a backing or support therefor during the severing operation, the parts of which are so arranged that the severing tool is permitted to advance and entirely cut away the supporting web, thus trimming the edge of the button to leave it with a smooth satisfactorily finished edge. In addition to this feature of backing and supporting the button, I have also adapted the tool to act as a chuck which is employed for withdrawing the completed button from the annulus.

It will be obvious that the finishing tool which actually severs the button from the blank may be arranged to operate either upon the front or rear face of the button, the backing and extracting tool being arranged to coöperate with the opposite side of the blank, although in the illustrations these parts are shown as operating upon the face and rear sides respectively of the button. In carrying out this feature of my invention I have arranged the backing and extracting tool, illustrated in Figs. 12 and 36, in alinement with the spindle of the finishing tool 8 which is advanced by the reciprocatory head 37 (Fig. 1) at such a time in relation to the finishing tool as to form a support for the button when it is severed from the annulus. This backing and extracting tool is unlike the other tools in that it does not revolve although it is supported in a bearing the same as the journal boxes heretofore described, on which is carried a pulley 280 acting as an idler, around which the belt 26 is passed.

The backing and chucking tool is supported in a spindle shell 281 slotted at its rear or outer end, as indicated at 282, and containing the longitudinally extending chuck operating thrust rod 283 which is supported centrally of the shell, near the forward end of the latter, by a collar 284 and at its opposite extremity, by laterally extending wings 285 which are guided in the slots 282 and are provided on their edges with screwed threads receiving the limiting collar 286 and the locking nut 287. The end of the shell is closed by a plug 288 having the annular groove 289$^a$ which receives the hooked end of the adjusting screw, corresponding to the part 44, shown in Fig. 10, which is carried on one of the arms of the reciprocatory head 37. Between the plug or cap 288 and the adjacent end of the rod 283 is a spring 289 forcing said rod forwardly which is capable of yielding to permit an independent movement of the shell 281 when the movement of the rod 283 is limited by the engagement of the nut 286 with the end of the pulley sleeve 290. The forward end of the shell 281 is provided with a threaded collar, forming a shoulder 291 which coöperates with a similar shoulder 292 formed on a sleeve 293 arranged within the shell and having an outer end projecting therefrom. This sleeve is normally projected outwardly with its shoulder 292 in engagement with the shoulder 291 by means of a coil spring 293$^a$ arranged between its rear end and the collar 284. The sleeve 293 is prevented from turning in the shell 281, but is guided for slight longitudinal movement thereon by a pin 293$^b$ lying in a small slot (Fig. 36). The shell 281 at the beginning of its rearward movement moves back on the sleeve 293 until the shoulder 291 engages the shoulder 292. Thereafter the sleeve is carried rearwardly and the jaws of the clutch are released. The chuck jaws indicated by 294 are formed as parts of a split sleeve, the inner end 295 of which is rigidly connected to the thrust rod 283. The open end of the sleeve constituting the mouth of the chuck is recessed sufficiently to receive one of the faces of the completed button, as shown in Fig. 36, and the edges of the chuck jaws are made thin in cross section to permit them to be readily inserted in the narrow annular space formed between the periphery of the button and the annular wall of the blank by the cutting tool or tools which previously acted on the blank. The chuck jaws are closed and opened by the engagement and disengagement of the conical surface thereon which coöperates with the tapering portion of the interior wall of the sleeve 293, as indicated at 296.

The chuck jaws themselves do not properly form the support or backing tool and, although, they may be used for this purpose, I prefer to support the button by a separate backing member 296$^a$. The latter lies centrally within the chuck jaws and is moved outwardly therein by a coil spring 297, said movement being limited by the head of a pin 298 secured in the end 295 of the chuck jaws 294. Also arranged within the part 296$^a$ is a screw 299 which may be adjusted longitudinally in the member relatively to the end of the pin 298 to limit the inward movement of the backing member as may be desired.

By referring to Figs. 12 and 36, the operation of the backing and extracting tool will be readily understood. Upon the inward movement of the head 37 (Fig. 1) the shell 281 and the parts carried therein are advanced in a direction from left to right until the backing member 296$^a$ engages the button and compresses the spring 297 at which time the stop collar or nut 286 engages the pulley sleeve 290 and limits the inward movement of the thrust rod 283. As the backing member 296$^a$ is now in engagement with the button the surrounding chuck jaws 294 are in position to engage the periphery of the button, their extremities lying within the annular channel previously cut in the blank, as shown in dotted lines in Fig. 36. The continued inward movement of the head 37 causing the shell 281 to be further advanced places the spring 289 under tension which holds the rod 283 stationary, and likewise compresses the spring 293$^a$ causing the chuck sleeve 293 to be advanced over the chuck jaws, whence the coöperating inclined surfaces 296 on these two parts cause the jaws to close. The movement of the sleeve 293 relatively to that of the jaws and the shell 281 is comparatively slight and the excess movement of the latter is accommodated by the compression of the spring 293$^a$.

While I prefer to employ a chuck for removing the finished button from the blank, this is not wholly essential and may be considered a refinement of the broader idea of supporting or "backing up" the button during the operation of the finishing tool. The adjustment of the backing tool requires considerable accuracy, and care must be exercised to obtain the proper pressure between the face of the button and the tool, otherwise the finishing tool may break it out instead of cutting it out of the blank, or the backing tool may break it out of the blank before the finishing tool has completed its work. The adjustment of the backing tool as a whole should be such that when the button is severed and the finishing tool reaches the limit of its forward movement, the button lies in the same position in the ring of the blank it occupied before it was severed. On account of the delicacy of adjustment of this tool, I only rely upon the adjusting screws of the head 37 for the coarser adjustment and mount the tool in the shell 281, which moves inwardly and outwardly with the head. The tool supported in the shell and movable independently therein is accurately limited in its inward movement by the stops thereon coöperating with the bearings or stationary part of the machine.

The finishing tool having performed its operation it is retracted, as previously explained, at which time the backing and extracting tool is also moved outwardly and the button released in the following manner. After the chuck jaws were locked the continued inward movement of the shell 281 caused the shoulder 291 to be moved forwardly out of engagement with the shoulder 292, the springs 293$^a$ and 289 being compressed. The retraction of the head 37 therefore first moves the shell 281 in a direction toward the left but as the thrust rod 283 is held in its projected position by the spring 289 there is no rearward movement of the backing tool or chuck during the first part of the retractive movement of the shell. By reason of the compression in the spring 293$^a$ the chuck jaw operating member or sleeve 293 remains projected holding the jaws closed in engagement with the button. However, as the outward or retractive movement of the shell 281 continues, its shoulder 291 is brought into engagement with the shoulder 292 of the sleeve 293 causing the latter to be moved in a rearward direction to release the jaws 294 and when this has been accomplished, the ends of the slots 282 in the shell may engage with the web 285 and cause the thrust rod and the connected parts to continue a rearward movement, in a direction away from the turret, as the backing tool and chuck are then carried outwardly with the shell to the limit of its movement. It is not necessary that the ends of the slots 282 be positioned to cause the rearward movement of the thrust rod as other coöperating stop projections might be employed for this purpose and in reality, the friction between the parts is sufficient to move the rod 283 rearwardly with the sleeve after the tension of the spring 289 has been relieved.

It will be remembered that when the backing member 296$^a$ was first brought into engagement with the button, it was arrested by the latter and the slight movement of the thrust rod which occurred thereafter caused the spring 297 to be compressed, consequently when the button is released by the opening of the clutch jaws, the recoil of the spring will cause the button to be ejected.

It will be understood that the backing and extracting tool may be operated to either advance after the button has been severed from the blank (while the finishing tool is retracting) and be operated to release and discharge the button while the tool is projecting through the turret plate, or it may be retracted and the chuck operating members actuated to discharge the button at the side of the turret on which the tool is located, but this is only dependent upon the shape of the grooves or slots formed in the cam 67 which controls the relative movements of the tool operating heads 37 and 38.

I have designated the member 283 on which the chuck jaws are carried as a thrust rod, but it might with equal appropriateness be termed a limiting stop member or tension rod, as it is positively advanced to the limit of its movement by shell in which it is inclosed and when arrested resists the tension of the springs 289 and 293ª. The same remarks may likewise be applied to other parts of the machine and it will be understood that the machine shown in the accompanying drawings illustrates one embodiment of my invention and that the spirit of the invention may be effected and carried out by other means than the precise arrangement of the parts I have shown.

I claim as my invention:

1. In a button turning machine, the combination with a carrier provided with a plurality of blank holding devices, a pair of tools for rough cutting the two faces of a button in a blank, and a pair of tools for subsequently operating upon said blank, one for finishing and severing the button from the blank, the other engaging and extracting the button from the blank, of means for intermittently advancing the carrier to position one holder thereon in alinement with the finishing tools, and another holder in alinement with the cutting tools and means for moving all the tools simultaneously toward the carrier to operate on blanks held in two different holders at the same time.

2. In a button holding machine, the combination with a carrier provided with a plurality of blank holding devices, a pair of spindles provided with tools for rough cutting the two faces of a button in a blank, and a second pair of spindles one of which is provided with a tool for finishing the face of a button and severing the button from the blank, the other spindle being provided with means for extracting the button when severed, of means for intermittently operating the carrier and moving the pairs of spindles relatively thereto.

3. In a button turning machine, the combination with a frame, apertured brackets arranged in sets fixed at the ends thereof, a bearing box arranged in the bracket of each set and devices for adjustably centering said boxes in their respective brackets in alinement with each other, of opposing tool spindles supported in the boxes, means for operating the spindles and a work piece support arranged between the ends of the tool spindles.

4. In a button turning machine, the combination with a frame, a set of two apertured brackets located at each end thereof, separate boxes located in each set of brackets and adjustable centering devices on the respective brackets for supporting and alining said boxes, internal bearings in the boxes and external bearings on their outer ends, of tool spindles journaled in the internal bearings, driving members operatively connected to the spindles and journaled on the external bearings and means for rotating the driving members, devices for moving the spindles longitudinally in the bearing boxes and a work piece support located between the opposing ends of the tool spindles.

5. In a turning machine, the combination with a frame having apertured brackets thereon, a bearing box located therein a tool spindle journaled in the box and devices for engaging the ends of the box for adjustably centering them in the apertures in the brackets, of a sleeve projecting at one end of the box, a driving member journaled on the sleeve and driving connection between it and the spindle, means for moving the latter longitudinally and a work piece support arranged in alinement with the tool spindle.

6. In a turning machine, the combination with a frame having separated apertured brackets thereon, a box comprising end portions located within the apertures of the brackets and having an intermediate connecting sleeve portion and separate bearings in the end portions and centering devices engaging the end portions of the boxes for adjustably securing them within said brackets, of a tool spindle journaled in said bearings, means for rotating the spindle and devices for operating it longitudinally in the box and a work piece holder arranged in front of the tool spindle.

7. The combination with a tool spindle provided with an annular shoulder and a member for reciprocating the spindle, a frame in which the spindle and member are guided and means for reciprocating the member, of a head carried on the member and located in alinement with the spindle, a tubular bolt adjustable in the head having an end coöperating with the shoulder on the spindle for retracting it and a thrust rod adjustable longitudinally within the bolt and engaging the spindle for imparting movement thereto in the opposite direction.

8. The combination with a tool spindle provided with an annular shoulder and a member for reciprocating the spindle, a frame in which the spindle and member are guided and means for reciprocating the member, of a head carried on the member and located in alinement with the spindle, two parts adjustably carried on the head and arranged one within the other and both coöperating with the spindle to connect it to the head, said parts being adjustable relatively to each other to act upon the spindle in opposite directions to take up lost motion between it and the head.

9. In a button turning machine, the combination with a frame, tool spindles journaled thereon, a reciprocatory member guided on the frame and arranged parallel with the spindles and a head on the member having arms extending in alinement with said spindles, of adjustable connections between each arm and its respective spindle for adjustably holding the latter in its relative longitudinal position in respect to the member and driving devices for rotating the spindles and imparting movement to the member.

10. In a button turning machine, the combination with a frame, a work piece support thereon and opposing tool spindles arranged at opposite sides thereof, of sliding operating members for each spindle guided on the frame, a single cam member provided with separate operating cam surfaces and operating levers actuated by said surfaces and imparting longitudinal reciprocatory movement to the sliding members.

11. In a button turning machine, the combination with a support for holding a plurality of blanks, a plurality of tools for simultaneously operating upon opposite sides of a plurality of blanks, a spindle for each tool, the spindles at each side of the support being arranged in sets and parallel to each other and those of one set being located in alinement with the correspondig spindles of the other set, of a reciprocating member for each set of spindles and adjustable connections between said member and each spindle for positioning them relatively to their respective reciprocating members, a single cam member disposed intermediately beneath the two sets of spindles and provided with separate cam surfaces and levers operated thereby and connected to the reciprocating members for imparting movement thereto.

12. In a button turning machine, the combination with a frame, a work piece support mounted thereon and a plurality of tools for operating upon both the front and rear faces of work pieces, said tools being arranged in sets at opposite sides of the support, a spindle for each tool, those of each set being arranged parallel to each other and in alinement with the spindles of the corresponding tool of the other set, of a separate bearing box supporting each spindle, stationary frame pieces embracing the boxes and devices for adjustably centering and securing the boxes in alinement on the frame pieces as specified, and operating devices for imparting rotary and longitudinal movement to the spindles in their boxes.

13. In a button turning machine, the combination with a frame, a work piece support mounted thereon and tools for operating upon the front faces of work pieces and similar tools for operating upon the rear faces of the work pieces, separate spindles for each tool and separate bearing boxes adjustably mounted on the frame and carrying at their outer ends pulleys for driving the spindles, of a line shaft journaled on the frame, pulleys thereon in alinement with the spindle pulleys, separate belts connecting the pulleys of adjacent spindles with their respective driving pulleys, belt tighteners coöperating with said belts and adjustably supported on the frame and devices for reciprocating the tool spindles.

14. In a button turning machine, the combination with a frame, a work piece support mounted thereon and a set of two tools arranged at each side of the work piece support, a separate spindle for each tool and journal boxes supporting spindles and adjustably mounted on the frame, of driving pulleys journaled on the outer ends of the boxes and connected with their respective spindles, a line shaft having pulleys thereon and idler pulleys adjustably located on the frame between the line shaft and spindles and driving belts surrounding the driving pulleys, spindle pulleys and idlers.

15. In a button turning machine, the combination with a frame, a rotary and longitudinally movable tool spindle, a turret located in front of the tool and a plurality of button blank holding devices arranged on the turret, each comprising a gripper, of an engine for operating each gripper, means for rotating the turret intermittently to move each holding device into operative position in front of the tool, a source of fluid supply under pressure, said parts being provided with passages connecting said source with said engines and valves controlling the flow of said fluid in the passages to cause the grippers to be opened and closed at predetermined points in the rotation of the turret.

16. In a button turning machine, the combination with a rotary and longitudinally movable tool spindle, a turret provided with a work piece holder comprising a movable gripper, a pneumatic engine for operating the latter and a source of fluid supply under pressure, said parts having a plurality of passages for connecting said source with the engine, of valves controlling the flow of fluid in the passages, means for rotating the turret intermittently and mechanism controlling said valves to actuate the engine at one point in the rotary movement of the turret, retain it in actuated condition and subsequently release it at another point in the movement of the turret.

17. In a button turning machine, the combination with rotary and longitudinally movable spindles arranged side by side containing roughing and finishing tools, a turret provided with a plurality of work piece holders, each comprising a gripper and a pneumatic engine for actuating each gripper, of means for rotating the turret to successively locate each holder in position in front of the tools and in an intermediate position clear of said tools for receiving work pieces, said parts having passages for supplying fluid under pressure to said engines for actuating the grippers successively when in the receiving, roughing and finishing positions and allowing said fluid to exhaust from the engines when in the finishing position, valves controlling the flow of fluid in said passages and devices for operating said valves at predetermined intervals.

18. In a button turning machine, the combination with roughing and finishing tool spindles, a revoluble turret having a work piece holder thereon comprising a movable gripper and a pneumatic engine for operating it, of mechanism for intermittently rotating the turret to move the holder thereon progressively from a position in which work pieces may be applied to it into alinement with the roughing and finishing tool spindles and again into said receiving position, a source of fluid supply under pressure, the parts being provided with passages leading from said source and conducting the supply of fluid to the engine in the various positions of the turret, valves controlling the flow of fluid in the passages and mechanism for operating said valves in timed relationship to the movement of the turret.

19. In a button turning machine, the combination with roughing and finishing tool spindles, a revoluble turret having a work piece holder thereon comprising a movable gripper and a pneumatic engine for operating it, of mechanism for intermittently rotating the turret to move the holder thereon progressively from a position in which work pieces may be applied to it into alinement with the roughing and finishing tool spindles and again into said receiving position, a source of fluid supply under pressure, the parts being provided with passages leading from said source and conducting the supply of fluid to the engine in the various positions of the turret, valves controlling the flow of fluid in the passages, one valve being adapted to admit the fluid to actuate the engine when the holder on the turret is in the receiving position and the other to cut off the fluid supply to release the gripper after the finishing operation has been completed, mechanism for operating the valves in timed relationship to the movements of the turret and mechanism for rotating the spindles and moving them relatively to the turret.

20. In a button turning machine, the combination with a frame, a rotary turret and a shaft on which the turret is journaled supported on the frame and provided with passages, a work piece support carried on the turret and comprising a gripper, a pneumatic engine for operating the latter, there being a passage leading therefrom and adapted to coöperate successively with the passages in the shaft, of a source of fluid supply under pressure connected to said passages, valves controlling the flow of fluid therein, a tool adapted to coöperate with a work piece on the holder and operating devices for driving the tool, rotating the turret and actuating the valves.

21. In a button turning machine, the combination with a frame, a shaft mounted thereon having passages and a turret journaled on the shaft having a work piece holder comprising a gripper, a pneumatic engine for actuating the latter, there being a passage leading therefrom and adapted to communicate at different points in the rotation of the turret with the different passages in the shaft, of mechanism for rotating the turret intermittently, a source of fluid supply under pressure connected to the shaft passages and valves controlling the flow of fluid in the latter, mechanism for operating the valves in timed relation to the successive intermittent movements of the turret, a tool and means for operating it into and out of engagement with a work piece on the holder.

22. In a button turning machine, the combination with a frame, a shaft mounted thereon and provided with passages, a turret journaled thereon and provided with a work piece holder comprising a movable gripper, a pneumatic engine for actuating the latter, there being a passage leading therefrom and adapted to communicate with the passages in the shaft at different points in the rotation of the turret, a source of fluid pressure supply connected with the shaft passages, valves controlling the flow of fluid therein and a tool adapted to coöperate with a work piece in the holder, of mechanism for rotating the turret intermittently, reciprocating devices for moving the tool relatively toward and from the holder an indexing shaft and cams thereon for controlling the operation of the valves, the turret rotating mechanism and the tool reciprocating devices.

23. In a button turning machine, the combination with a frame, a shaft mounted thereon and provided with passages, a turret journaled thereon and provided with a work piece holder comprising a movable gripper, a pneumatic engine for actuating the latter, there being a passage leading therefrom and adapted to communicate with the passages in the shaft at different points in the rotation of the turret, a source of fluid pressure supply connected with the shaft passages, valves controlling the flow of fluid therein and a tool adapted to be reciprocated relatively to the turret, of an indexing shaft, mechanism for intermittently rotating the turret, cams on the shaft controlling the movement of the valves, the reciprocatory operation of the tool and the movement of the turret rotating mechanism.

24. In a button turning machine, the combination with a reciprocatory tool, a turret located in front of it having a work piece holder mounted thereon comprising a gripper, a pneumatic engine for operating it, there being passages communicating with the engine, a source of fluid pressure supply, valves for controlling the flow of liquid in the passages and a reciprocatory member connected to the tool, of an indexing shaft, a cam thereon for actuating the reciprocatory member, and cams for operating the valves to control the movement of the gripper, mechanism for rotating the turret intermittently, a controlling device governing the operation of said mechanism and a separate cam on said shaft for actuating the controlling device.

25. In a machine for automatically operating upon blank work pieces, the combination with a turret having a work piece holder thereon comprising a gripper, a device for feeding work pieces to the holder when the turret is in receiving position, a tool adapted to coöperate with a work piece and means for rotating the turret intermittently from the receiving position to a cutting position with the holder in alinement with the tool and subsequently rotate it to again place the holder in the receiving position, of pneumatically operated devices for actuating the gripper embodying passages, a source of fluid pressure supply and valves for controlling the flow of fluid in the passages, mechanism for operating said valves in timed relationship to the movements of the turret to actuate the gripper when in the receiving position, maintain it actuated in the cutting position and subsequently release it in readiness to receive another work piece when the turret is moved to again place the holder in receiving position.

26. In a button turning machine, the combination with a tool, a movable turret arranged in front of the tool having a button blank holder thereon comprising a movable gripper, means for operating the turret to carry the holder from a receiving position in which a blank may be inserted into a position in alinement with the tool in which the blank may be operated upon and subsequently restoring it to the receiving position, of a pneumatic engine for actuating the gripper, a source of fluid pressure supply, there being passages leading therefrom to the engine, valves for controlling the flow of fluid therein and mechanism for operating the valves in timed relationship to the movement of the turret for actuating the gripper when in receiving position, maintaining it actuated when the holder is moved into the operating position and releasing it in readiness to receive a blank when said holder is again moved into receiving position.

27. In a button turning machine, the combination with roughing and finishing tools arranged adjacent to each other, a turret located in front of the tools having a plurality of button blank holders thereon each comprising a movable gripper, means for rotating the turret intermittently to successively carry each holder from a position in which blanks may be inserted therein to a position in alinement with the roughing tool and into a similar position in respect to the finishing tool and subsequently returning them successively into the receiving position, of pneumatic engines for actuating each gripper, a source of fluid pressure supply, there being passages for connecting it with said engines, valves for governing the flow of fluid in said passages and mechanism for controlling the movement of the valves to actuate successively the grippers of each holder when in the receiving position, maintain each gripper operated during the roughing and finishing operations and successively release the grippers after the finishing operation, and mechanism for moving the tools relatively to the turret during its periods of rest.

28. In a button turning machine, the combination with a tool, a turret arranged in proximity thereto having a button blank holder comprising two pivoted gripper arms, a perforated shaft supporting the turret cylinders arranged at the outer edge of the turret having pistons connected to the arms, of means for rotating the turret intermittently, the latter being provided with passages extending inwardly from the cylinder to the shaft for supplying fluid under pressure to said cylinders, mechanism for adjusting the tool relatively to the turret and means controlling the flow of fluid in the passages to govern the movement of the gripper arms.

29. In a button turning machine, the combination with a tool, a work piece holder comprising a support, and two gripper arms pivoted thereon and cylinders also located on the support and provided with pistons connected to said arms, there being passages for supplying fluid under pressure to said cylinders, of a source of fluid supply, pipes connecting it to said passages, valves in the pipes controlling the flow of fluid in said pipes and passages, mechanism for reciprocating the tool relatively to the holder and means for controlling said valves to operate the gripper arms into and out of engagement with a work piece in timed relationship to the movement of the tool.

30. In a button turning machine, the combination with a revoluble support, a plurality of work piece holders thereon each comprising gripper arms pivoted to the face of the support, cylinders arranged on the latter beneath the ends of the arms and provided with pistons coöperating with said arms, a shaft on which the support is journaled provided with passages, there being other passages leading from the cylinders and adapted to communicate with those in the shaft at different points in rotation of the support, of means for intermittently rotating the latter, a tool and devices for operating it relatively toward and from the support during the pauses in the rotary movement of the latter, a source of fluid pressure supply connected to the shaft passages, valves for controlling the flow of fluid in the shaft passages and mechanism for operating said valves in timed relationship to the intermittent rotary movement of said support.

31. In a button turning machine, the combination with a revoluble support provided with a hub, a plurality of work piece holders thereon each comprising pivoted gripper arms, cylinders carried on the support having pistons for operating the arms, there being passages leading from the cylinders to the interior of the hub, a shaft extending through the latter and provided with passages terminating in ports arranged at different points about its circumference and adapted to register with the passages in the hub, of a source of fluid pressure supply connected to the shaft passages, valves controlling the flow of fluid in the latter, mechanism for rotating the support and indexing devices controlling the movement of said valves and the operation of said mechanism to intermittently rotate the support and open and close the grippers periodically, a tool adapted to coöperate with work pieces in the holders and devices for moving the tool relatively to the support during its periods of rest.

32. In a button turning machine, the combination with a frame, two opposed relatively movable reciprocatory tools, a revoluble support located between the tools provided with a plurality of work piece holders each comprising grippers, cylinders mounted on the support having pistons therein for operating the grippers, a shaft mounted on the frame on which said support is journaled and provided with passages, there being other passages leading from the cylinders and adapted to communicate with those in the shaft, of a source of fluid pressure supply for said passages, valves for controlling the flow of fluid therein, mechanism for rotating the support intermittently and a device controlling the operation of said mechanism, reciprocating devices connected to the tools for moving them relatively to the support, a continuously rotated indexing shaft, cams thereon for actuating the reciprocating devices and other cams on said shaft for operating the valves and governing the operation of the controlling device of the turret operating mechanism.

33. In a button turning machine, the combination with a reciprocating turning tool, a revoluble turret rotating in a fixed bearing in the path of the tool having a work piece holder thereon and means for reciprocating the tool toward and from the turret, of a fluid operated engine comprising a movable part, driving connections and between said part and the turret, a source of fluid pressure supply and means for controlling the flow of said fluid to the engine and governing the intermittent rotation of the turret in timed relation to the reciprocatory movement of the tool.

34. In a button turning machine, the combination with a reciprocating turning tool, a revoluble turret journaled in fixed bearings in the path of the tool having a plurality of work piece holders thereon and mechanism for reciprocating the tool toward and from the turret to move it into engagement with work pieces in the holders, of a fluid operated engine comprising a movable part, driving connections between said part and the turret, a source of fluid pressure supply connected by passages with the engine, a valve controlling the flow of fluid in the passages and means for actuating the valve to govern the operation of said engine and controlling the intermittent rotation of the turret in timed relation to the reciprocatory movement of the tool.

35. In a button turning machine, the combination with a turning tool, a revoluble turret having a work piece holder thereon and means for reciprocating the tool, of a fluid operated engine comprising a reciprocatory piston, an element oscillated by the piston and detachable connections between the oscillatory element and turret for driving the latter in one direction and means for locking the driving connections to the oscillatory element when the latter is rotated in one direction.

36. In a button turning machine, the combination with a turning tool, a revoluble turret having a work piece holder thereon and means for reciprocating the tool, of a fluid operated engine comprising a reciprocatory piston, an oscillatory element operated by the reciprocatory movement of the piston, a member adapted to be driven by the oscillatory element for driving the turret progressively in one direction, a device for locking the member to the element and means for actuating said device at the limit of the movement of the oscillatory member in one direction for operatively connecting the driven member thereto and operating it at the limit of movement of the member in the other direction to disconnect said device from said oscillatory member.

37. In a machine of the character described, the combination with a reciprocatory turning tool, a turret having a work piece holder thereon and a fluid operated engine comprising a piston, of an element operated by the piston, a member normally disconnected from the element but coöperating with the turret for imparting rotary movement thereto and a locking device for connecting the member to the element, means for moving the device into operative position relatively to the movement of the piston in one direction, to effect a movement of the turret, and into inoperative position relatively to the movement of the piston in the other direction, to disconnect said member and element.

38. In a machine of the character described, the combination with a reciprocatory turning tool, a turret having a work piece holder thereon and a fluid operated engine comprising a piston, of an element operated by the piston, a member normally disconnected from the element but coöperating with the turret for imparting rotary movement thereto and a movable locking device for connecting the member to the element, a locking member coöperating with the turret to retain it in adjusted position and means for reversing said locking members, to release the turret and complete the driving connections, relatively to the movement of the piston in one direction whereby the turret is rotated in one direction and subsequently reverse their positions for the purpose of locking the turret in adjusted position and disconnecting the turret driving parts relatively to the movement of the piston in the other direction.

39. In a machine of the character described, the combination with a reciprocatory turning tool, a turret having a work piece holder thereon and a fluid operated engine comprising a cylinder and a piston reciprocating therein, of a member oscillated in opposite directions by the movement of the piston and driving connections between the member and turret for rotating the latter intermittently in one direction.

40. In a machine of the character described, the combination with a reciprocatory turning tool, a turret having a work piece holder thereon and a fluid operated engine comprising a cylinder and a piston reciprocating therein, of a member oscillated by the piston, a turret driving member for rotating the turret in one direction and a part for detachably connecting the turret driving member to the oscillated member during its movement in one direction.

41. In a machine of the character described, the combination with a reciprocatory turning tool, a turret having a work piece holder thereon and a fluid operated engine comprising a cylinder and a piston reciprocating therein, of a member oscillated by the piston, a ring surrounding said member and coöperating with the turret for rotating it in one direction and a locking device for connecting the ring and member during the rotary movement of the latter in one direction.

42. In a machine of the character described, the combination with a reciprocatory turning tool, a turret having a work piece holder thereon and a fluid operated engine comprising a cylinder and a piston reciprocating therein, of a member oscillated by the piston, a ring surrounding said member and coöperating with the turret for rotating it in one direction, a bolt carried on the member and adapted to engage the ring to lock it to the member, another bolt adapted to engage the turret to retain it in shifted position and means for retracting the latter to unlock the turret and projecting the first mentioned bolt to effect the rotation of the turret upon the movement of the oscillatory member in one direction.

43. In a machine of the character described, the combination with a reciprocatory turning tool, a turret provided with gear teeth and having a work piece holder thereon and a fluid operated engine comprising a cylinder and a piston reciprocating therein provided with rack teeth, of a hub provided with teeth coöperating with those of the piston, a gear ring journaled on the hub and intermeshing with the teeth on the turret, and a bolt movable transversely of the hub and adapted to detachably connect the gear ring thereto.

44. In a machine of the character described, the combination with a reciprocatory tool, a turret having a work piece holder thereon and a fluid operated engine comprising a cylinder provided with a piston, of a member driven by the latter and provided with a chamber, a turret driving member normally disconnected from the driven member and a fluid operated locking device for connecting the driven and driving members, a source of fluid pressure supply, there being passages connecting it with the cylinder and the chamber in the driven member and means for controlling the flow of fluid in said passages.

45. In a machine of the character described, the combination with a reciprocatory tool, a turret having a work piece holder thereon and a fluid operated engine comprising a cylinder provided with a piston, of a member driven by the latter and provided with a chamber, a turret driving member normally disconnected from the driven member and a fluid operated locking device for connecting the driven and driving members, a source of fluid pressure supply, there being passages leading from said source into communication with the chamber for admitting fluid to project and retract the locking device and other passages leading from the chamber to the cylinder having ports which are respectively opened and closed by the movement of the locking device and conveying fluid to the ends of the cylinder and a valve controlling the flow of fluid in the passages leading to the chamber.

46. In a button turning machine, the combination with a reciprocatory turning tool, a turret having a work piece holder, a fluid operated engine comprising a cylinder provided with a reciprocating piston and a driven member oscillated by the piston, a turret driving member adapted to be operated by the driven member and a fluid operated device for locking the driving and driven members together, said device being arranged in a chamber provided in one of said parts, of a source of fluid pressure supply, there being passages leading therefrom to the chamber for admitting fluid for projecting and retracting the locking device and other passages opened and closed by the movement of said device and leading to said cylinder for controlling the movement of the piston therein and a main valve controlling the flow of fluid in the passages leading to the chamber.

47. In a button turning machine, the combination with a reciprocatory turning tool, a turret having a work piece holder, a fluid operated engine comprising a cylinder provided with a piston and a driven member operated by the piston, a turret driving member adapted to be operated by the driven member and a fluid operated device for locking the driving and driven members together, a second fluid operated device for locking the turret in adjusted position, said two locking devices being arranged in separate chambers, of a source of fluid pressure supply, there being passages leading therefrom to the chambers of the two locking devices interconnecting said chambers and also connecting them with the cylinder, said passages being so arranged that the turret locking device is retracted and the driving connecting lock is projected upon the admission of fluid to said passages to control its admission to the cylinder to move its piston in one direction to effect the rotation of the turret.

48. In a button turning machine, the combination with a reciprocatory turning tool, a turret having a work piece holder, a fluid operated engine comprising a cylinder provided with a piston and a driven member operated by the piston, a turret driving member adapted to be operated by the driven member and a fluid operated device for locking the driving and driven members together, a second fluid operated device for locking the turret in adjusted position, said two locking devices being arranged in separate chambers, of a source of fluid pressure supply, there being two sets of passages leading therefrom to the chambers interconnecting them and also communicating between said chambers and the ends of the cylinder, one set of said passages being so arranged that upon admission of fluid to them the turret lock is retracted and the driving connecting lock is projected and the admission of fluid to one end of the cylinder is permitted, the other set of passages being arranged so that the admission of fluid thereto causes the driving connecting lock to be retracted, the turret lock to be projected and fluid admitted to the other end of the cylinder to restore the piston independently of the turret and valve mechanism for controlling the flow of fluid in said sets of passages.

49. In a button turning machine, the combination with a frame, a reciprocatory turning tool, a revoluble turret having gear teeth and provided with a button blank holding device, a cylinder having a piston and a driven member oscillated by the piston and provided with a transverse chamber and a frame piece provided with a similar chamber, a turret locking bolt provided with a piston located in the frame chamber, a driving gear ring journaled on the driven member and coöperating with the turret and a member for locking the ring and member together provided with a piston located in the chamber in said member, of a source of fluid pressure supply, there being passages leading therefrom to the ends of the two chambers and interconnecting passages between the cylinders, controlled by the pistons therein whereby the projecting of one locking device into operative position insures the retraction of the other device into inoperative position and there also being other passages leading from said chambers to the ends of the cylinders and also controlled by the movement of the pistons therein for permitting the fluid to be supplied to one end or the other of the cylinder.

50. In a button turning machine, the combination with a reciprocatory tool, a revoluble turret having a plurality of work piece holders thereon each provided with a movable gripper, separate fluid operated engines for actuating each gripper, a fluid operated engine for driving the turret intermittently and a continuously rotating indexing shaft, of devices operated by the shaft for reciprocating the tool into successive engagement with work pieces in the holders during the periods of dwell of the turret, a source of fluid pressure supply, there being passages leading therefrom to the turret engine and other passages adapted to connect said source with the gripper engines successively during the rotation of the turret, valves controlling the flow of fluid in said passages and indexing means operated by said shaft for actuating the valves in timed relationship to the reciprocatory movement of the tool.

51. In a turret operating mechanism for button turning machines, the combination with a turret provided with a gear ring, a driving pinion ring meshing therewith and a driven member arranged within the latter and provided with a chamber, of a fluid operated engine comprising a cylinder having a piston operatively connected to the driven member, and a bolt located in the chamber in said member for detachably connecting it to the turret driving member, a source of fluid pressure supply and valve controlled passages connecting it with said chamber and connecting the latter with the opposite ends of the cylinder, said passages being so arranged that the admission of fluid to one end of the cylinder will cause the bolt to be moved into operative position to lock the parts and its admission to the other end of said cylinder will cause said bolt to be moved into an inoperative position to disconnect the driven and driving members.

52. In a turret operating mechanism for button turning machines, the combination with a revoluble turret, a frame part adjacent thereto and provided with a chamber, a driving pinion ring coöperating with said turret and a driven member journaled in the frame and having a portion extending into the pinion ring and provided with a chamber, of a cylinder, a piston located therein and connected to the driven member and imparting oscillatory movement thereto and piston bolts located in the two chambers, one for locking the turret, the other for locking the driven member and ring together, a source of fluid pressure supply, valve controlled passages leading therefrom to the ends of the chambers, interconnecting the latter and also connecting them with the ends of the cylinder, said passages being so arranged that fluid admitted to operate the piston in one direction will cause the turret locking bolt to be withdrawn and the other bolt projected to lock the driven member and ring together and vice versa when said fluid is admitted to operate the piston in the other direction.

53. In a button turning machine, the combination with a reciprocatory tool, a turret having a work piece holder thereon and mechanism for operating the turret to move said holder into and out of operative position relatively to the tool, and mechanism for advancing and retracting the tool relatively to the turret, of indexing devices for controlling the relative movements of said mechanisms, devices for imparting movement thereto comprising driving and driven members, means for holding said members in operative engagement, devices for releasing said means embodying a trip for actuating them to permit said members to be disengaged and a device coöperating with the turret to lock it with its holder in operative position and arranged to project in the path of the trip when retracted to unlock the turret.

54. In a button turning machine, the combination with a reciprocatory tool, a turret having a work piece holder thereon and mechanism for operating the turret to move said holder into and out of operative position relatively to the tool, and mechanism for advancing and retracting the tool relatively to the turret, of indexing devices for controlling the relative movements of said mechanisms comprising a revoluble shaft, means for imparting movement thereto comprising disengageable driving and driven members, devices for retaining the latter in operative engagement comprising a latch member, releasing devices carried on the indexing shaft embodying a trip for disengaging the latch and a bolt coöperating with the turret to lock it having a portion arranged to coöperate with the latch when the bolt is retracted to unlock the turret.

55. In a button turning machine, the combination with a reciprocatory tool, a turret having a work piece holder thereon and fluid operated mechanism for rotating the turret and a fluid operated locking member coöperating with the latter after each movement to rigidly secure it in shifted position, of an indexing shaft and means operated thereby for actuating the tool and controlling the movement of the turret operating mechanism and the locking member, driving mechanism for rotating the shaft comprising driving and driven clutch members, means for holding them in operative engagement comprising a latch, and releasing means carried on the shaft and embodying a trip for actuating the latch to permit said member to be disengaged and a portion on the locking member adapted to project into the path of the trip when it is shifted into a position to release the turret.

56. In a button turning machine, the combination with a reciprocatory tool, a turret having a work piece holder thereon and fluid operated mechanism for rotating the turret and a fluid operated locking member coöperating with the latter after each movement to rigidly secure it in shifted position, of an indexing shaft and means operated thereby for actuating the tool and controlling the movement of the turret operating mechanism and the locking member, a driven shaft and driving connections between it and the indexing shaft, a driving member and a clutch member attached to the driven shaft coöperating with the driving member, an operating arm for moving the clutch member and a spring operated rod connected thereto, a latch located in alinement with the indexing shaft and cooperating with the rod to hold the clutch member in engagement with the driving member, devices for releasing the latch carried on the indexing shaft and comprising a trip and a part on the turret locking member adapted to project in the path of the trip when said member is moved into a position to release the turret.

57. In a button turning machine, the combination with a turning tool and an intermittently movable support having a work piece holder thereon, of a horizontally disposed blank holding table, gripping fingers adapted to engage opposite faces of a blank on the table and means for operating them to seize a blank, withdraw it from the table and transport and deposit said blank into the work piece holder in timed relationship to the movement of said support.

58. In a button turning machine, the combination with a turning tool and an intermittently movable support having a work piece holder thereon, of a blank holding table disposed in substantially a horizontal plane, gripping fingers adapted to engage opposite sides of a blank on the table, and means for retracting the fingers to remove the blank from the table, rotating them to carry the blank into proximity to the support and then project them to deposit the blank in the holder during the period of dwell of the support.

59. In a button turning machine, the combination with a turning tool and an intermittently movable support having a work piece holder thereon, of an intermittently movable table adapted to receive a plurality of button blanks, devices for transferring successive blanks from the table to the holder on the support comprising gripping fingers, means for operating them into a position within the edge of the table and into engagement with a blank and to withdraw it therefrom, carry it into proximity with the support and deposit it in the holder thereon in timed relationship to the movement of the support and devices for moving the table to position a new blank upon each movement of said support.

60. In a button turning machine, the combination with a turning tool and a revoluble intermittently movable turret having a plurality of holders for work piece blanks thereon and a revoluble blank supporting table, of devices for transferring blanks successively from said table to the holders on the turret upon each intermittent movement of the latter said transferring devices comprising grippers movable in a plane extending radially of the revoluble table and driving connections timed to the movement of the turret for operating the table to place new blanks in position for removal by the transferring devices.

61. In an automatic machine for operating upon blank work pieces, the combination with a support having a plurality of work piece holders thereon and a tool coöperating therewith, of means for moving the support intermittently and operating the tool relatively to the holders, a table adapted to hold a plurality of said work pieces and means for rotating it relatively to the movement of the support, devices for transferring successive work pieces from the table to the support and placing them successively in the holders thereon during the periods of dwell of the support.

62. In an automatic machine for operating upon blank work pieces, the combination with an intermittently movable support revolving in a vertical plane and provided with a work piece holder, of a movable table revolving in a horizontal plane and adapted to support work pieces, devices for operating the support and table intermittently in unison with each other, mechanism located above the support and at one side of the table for transferring blanks from the latter to the holder on the support and devices timed to the movement of the support and table for operating said mechanism.

63. In an automatic machine for operating upon blank work pieces, the combination with a revoluble support having a plurality of work piece supports thereon, means for rotating it intermittently to move said holders successively from a receiving into an operative position, a tool and means reciprocating it relatively to said support and into successive coöperative engagement with work pieces in the holders as they are brought into the operative position, of a work piece feeding table arranged in juxtaposition to the support and mechanism for transferring from the table successive work pieces thereon to the successive holders and operating devices timed relatively to the movements of the support and tool for causing said transferring mechanism to traverse the distance between the table and support upon each movement of the latter.

64. In an automatic machine for operating upon blank work pieces, the combination with a revoluble support having a plurality of spaced work piece holders thereon, means for intermittently rotating said support to successively carry each holder into a receiving position and advance it into an operative position, a tool and means for reciprocating it relatively to the support and into coöperative engagement with work pieces successively placed in the operative position, of a horizontally revoluble work piece feeding table arranged adjacent the support, devices movable in a plane radial to the axis of the movement of said table for gripping work pieces thereon and carrying them from said table to the work piece holders as the latter are successively placed in the receiving position and means for operating said transferring devices actuated during the movement of the tool into and out of engagement with another work piece.

65. In a button turning machine, the combination with a turret having button blank holders thereon and journaled for rotation in a vertical plane, a blank holding table disposed in a horizontal plane arranged with its axis located in the plane of the axis of the turret and means for rotating the turret and table, of transferring devices operating in a vertical plane coincident with the axes of the table and turret for extracting blanks from the former and presenting them to the holders on the latter, and a tool for operating on blanks held in the holders.

66. In a button turning machine, the combination with a turret having a button blank holder, a turning tool, a blank feeding table and devices for operating the parts, of a pair of gripping devices adapted to engage a blank between them, an oscillatory driving member for imparting movement to said devices and a cam member also coöperating with said devices for guiding them in their movement relatively toward and from both the feeding table and turret and causing them to traverse the distance between said parts.

67. In a button turning machine, the combination with a turret having a button blank holder, a turning tool, a blank feeding table and devices for operating the parts, of a pair of gripping arms, one of which is movable relatively to the other, for yieldingly engaging opposite sides of a blank at their outer ends, an oscillatory driving member connected to the arms for imparting movement to them, a plate having a cam slot and a projection on the rear ends of the arms resting in said slot, the latter being formed to cause the arms to move in straight lines at an angle of approximately ninety degrees to each other at each end of their movement and to sweep over the space subtended by said angle during the intermediate portion of their movement.

68. In a button turning machine, the combination with a turret having blank work piece holders thereon, a blank feed table located in proximity thereto and a frame piece arranged at one side of the turret, of a projection thereon, a plate having a cam slot and an oscillatory driving member, two connected gripper arms one of which is guided on the frame projection, other projections on said arms coöperating with said cam slot and driving member and means for operating the latter in timed relationship to the movement of the turret.

69. In a button turning machine comprising a turret having work piece holders thereon, and embodying a tool and a work piece feed table, the combination with a frame piece mounted at one side of the turret, a slotted crank arm journaled therein and a plate located at one side of the arm and provided with a cam slot, of a gripper arm guided for reciprocatory and rotary movement on said frame piece and provided with a projection coöperating with the slots in the cam plate and crank arm and a coöperating gripping member carried on the gripper arm.

70. In a button turning machine comprising a turret having work piece holders thereon, and embodying a tool and a work piece feed table, the combination with a frame piece mounted at one side of the turret, a slotted crank arm journaled therein and a plate located at one side of the arm and provided with a cam slot, of a gripper arm guided for reciprocatory and rotary movement on said frame piece and provided with a projection coöperating with the slots in the cam plate and crank arm, a coöperating gripping member yieldingly supported on the gripper arm and a device supported on the frame piece and adapted to coöperate with the yielding gripper member when it is moved in one direction to effect movement of said member relatively to the arm.

71. In a button turning machine, the combination with a turret and a blank feed table, of a frame piece located above the turret and at one side of the table, two coöperating gripper arms adapted to engage opposite sides of a blank on the table, a crank arm for imparting movement to said gripper arms and guiding connections between the latter and frame for permitting a reciprocatory and rotary movement of the gripper arms, a plate having a cam slot in which a portion of said arms engages, said slot being formed to cause the arms to be oscillated between the table and the turret and at one end of said oscillatory movement to be reciprocated relatively to the table and at the other relatively to the turret.

72. In a button turning machine, the combination with a turret having blank holding devices thereon, a blank feeding table and transferring devices for carrying blanks from the table to the turret and depositing them in the holders thereon, of means for imparting rotary movement intermittently to the turret, a member for imparting movement to the transferring devices and means for operating said member comprising a connecting member which is capable of yielding when said transferring devices reach the limit of their movement in either direction in respect to said table and turret.

73. In a button turning machine, the combination with a turret having blank holding devices thereon, a blank feed table and transferring devices for carrying blanks from the table to the turret and depositing them in the holders thereon, of an indexing shaft, means controlled thereby for imparting intermittent rotary movement to the turret and a cam on said shaft, a member for imparting movement to the transferring devices and driving connections between said cam and member comprising devices capable of yielding when said member has operated the transferring devices to the limit of their movement.

74. In a button turning machine, the combination with a turret having a plurality of blank holding devices thereon, a tool adapted to coöperate with said blanks and a blank feeding table, of an indexing shaft, means controlled during the movement of the shaft for intermittently rotating the turret, a cam on the shaft, an arm oscillated by said cam for reciprocating the tool during the periods of rest of the turret, devices for transferring blanks from the table to holders on the turret, a member for operating the transferring devices and operating connections between said member and the oscillatory arm for actuating the transferring devices to carry a blank from the table to one of the holders on the turret during the movement of the tool into and out of engagement with another blank in another of the holders of the turret.

75. In a button turning machine, the combination with a turret having a plurality of blank holding devices thereon, a tool adapted to coöperate with said blanks and a blank feed table, of an indexing shaft, means controlled during the movement of the shaft for intermittently rotating the turret, a cam on the shaft, an arm oscillated by said cam for reciprocating the tool during the periods of rest of the turret and devices for transferring blanks from the table to holders on the turret, an oscillatory member for operating the transferring devices provided with a pinion, a rack bar coöperating therewith and having a portion capable of yielding when the pinion is arrested at its limit of movement and connections between said bar and oscillatory tool operating arm for imparting reciprocatory movement to said bar.

76. In a button turning machine, the combination with a work piece holder, cutting tools for operating upon the front and rear faces of the blank to form a button therein and a finishing tool adapted to subsequently coöperate with one side of the blank to sever the button therefrom, of a backing tool arranged in opposition to the finishing tool and adapted to yieldingly engage the opposite side of the button and support it when said finishing tool severs it from the blank, and means for operating the finishing and backing tools relatively to each other and to the work piece holder.

77. In a button turning machine, the combination with a work piece holder, cutting tools for operating upon the front and rear faces of the blank to form a button therein and a revoluble cutting tool adapted to subsequently coöperate with one side of the blank to sever the button from the blank, of a non-revoluble backing tool adapted to engage the opposite side of the button for the purpose of supporting it during the operation of the cutting tool, means for operating the cutting and backing tools relatively to each other and devices for moving the backing tool in respect to said operating means to cause it to engage the button in advance of the cutting tool.

78. In a button turning machine, the combination with a work piece holder, tools adapted to coöperate with a work piece therein for forming the front and rear faces of a button, of a cutting tool adapted to subsequently engage one of the sides of the blank to sever the button therefrom, another tool adapted to coöperate with the other face of the button comprising a backing member for supporting the button while being severed and chuck jaws for gripping the button and means for operating the cutting tool and the combined backing and chucking tool relatively to each other and to the work piece holder.

79. A button turning machine, comprising a work piece holder, cutting tools for forming the front and rear faces of a button in a blank, an extracting tool adapted to subsequently engage one of the faces of a button comprising gripping members, another cutting tool adapted to coöperate with the other face of the button to sever it from the blank, and means for moving the extracting tool into proximity to the button, and operating its members into engagement therewith to support the button before it is severed from the blank.

80. In a button turning machine, the combination with a work piece holder, a pair of cutting tools arranged in alinement and adapted to operate upon opposite faces of a work piece, a severing tool and a holding tool also arranged in alinement and both adapted to enter the recesses formed in the work piece by the rough cutting tools, said holding tool comprising gripping devices adapted to engage a portion of the article formed by one of the rough cutting tools, of means for advancing the holder to successively present a work piece to the two pairs of tools and mechanism for operating the latter relatively to the work piece holder.

81. The combination with a button turning machine comprising a work piece holder, a stationary bearing and a member movable relatively to the latter, of a backing tool supported in the bearing comprising a supporting part adapted to be operated relatively to the work piece holder by said member and a supported part which is adapted to engage the work piece said supported part being adapted to engage the bearing to limit its movement relatively to work piece independently of the movement of the supporting part.

82. The combination with a button turning machine comprising a work piece holder, a bearing and a reciprocatory member movable relatively to the latter, of a tool comprising a work piece engaging member, a part supporting it guided in said bearing and connected to the reciprocatory member, a stop on the engaging member coöperating with the bearing for limiting the movement of said engaging member in a direction toward the work piece holder and yielding connections between the latter and its supporting part.

83. The combination with a button turning machine comprising a work piece holder, a stationary frame piece and a reciprocatory member movable relatively to the frame piece, of a work piece backing tool comprising a work piece engaging member, a shell supporting it guided in the frame piece and operated by the reciprocatory member, yielding connections between the shell and engaging member and coöperating stops on the latter and the frame piece for limiting the movement of the engaging member in one direction.

84. The combination with a button turning machine comprising a work piece holder, a stationary frame piece and a reciprocatory member movable relatively to the frame piece, of a work piece backing tool comprising a shell guided on the frame piece and operated relatively to the holder by the reciprocatory member, a rod located in the shell having a yielding work piece engaging member thereon, a spring arranged between the shell and the rod, a shoulder on the latter adapted to engage the frame piece, said shoulder and frame piece constituting coöperating stop members, one of which is adjustable.

85. The combination with a button turning machine comprising a work piece holder, a relatively stationary frame piece and a member reciprocating relatively thereto, of a tool adapted to coöperate with a work piece on the holder comprising a supporting part guided on the frame piece and connected to said member, by means of which it is operated through a given distance relatively to the work piece holder, a separate part yieldingly connected to the supporting part and adapted to contact with a work piece, said contacting part being provided with a stop adapted to coöperate with the frame piece to limit its movement in a direction toward the work piece holder.

86. The combination with a button turning machine comprising a work piece holder, a relatively stationary frame piece and a member reciprocating relatively thereto, of a tool adapted to engage a work piece on the holder comprising a supporting part guided on the frame piece and connected to said member, by means of which it is operated through a given distance relatively to the work piece holder, a separate part carried on the supporting part and embodying work piece engaging jaws and having a stop adapted to coöperate with the frame piece, yielding connections between said parts of the tool, a jaw operating member and a spring arranged to be compressed by the supporting member to move said jaw operating member relatively to the jaws when the latter have been arrested.

87. The combination with a button turning machine comprising a work piece holder, a stationary frame piece and a reciprocatory member movable relatively thereto, of a tool adapted to engage a work piece on the holder comprising a shell guided on the frame piece and operated through a given predetermined distance by the reciprocatory member, a rod movably supported therein and provided with gripping devices at one end and having a stop adapted to engage the stationary frame piece to limit its movement in a direction toward the work piece holder, a spring arranged between the shell and rod for moving the latter in one direction until arrested and permitting the continued movement of the former in the same direction, a member for operating the gripping devices and a spring for actuating it which is compressed to move said member by said continued movement of the shell.

88. A feed mechanism having fingers, mechanism for advancing the fingers in a given plane in substantially a right line toward a blank, for withdrawing the fingers in substantially a right line with a blank, for oscillating the fingers so as to turn the blank substantially 90 degrees in said plane, and for carrying the fingers with the blank in substantially a right line after having been turned 90 degrees.

89. In a machine, for turning buttons from irregular shaped blanks formed with oppositely disposed flat and rounded faces, the combination with a cutting tool and a work piece holder, of a support for receiving said blanks, all of which are similarly disposed on the support with one of said faces uppermost, and grippers moving in a straight line first toward the support to engage said flat and rounded faces of the blanks and then away from the support for removing the blanks therefrom and transporting them to the work piece holder.

90. In a machine for turning buttons from sawed blanks irregular in shape, having oppositely disposed flat and rounded surfaces, the combination with a cutting tool, a holder adapted to receive the blanks and a support for receiving a plurality of the latter, of movable fingers having a straight line motion in the plane of the support and traveling in a direction toward the support, to engage the blanks and in a direction away from the support to pick the blanks from the table and transport them to said holder.

91. In a machine for turning buttons from sawed blanks of irregular shape, each having a flattened face and an opposed irregularly rounded face, the combination with a cutting tool and a holder adapted to receive the blanks, of a table supporting a plurality of said blanks with their flattened faces lowermost and gripping mechanism comprising a finger for extending across and engaging the corresponding face of the blank and a coöperating pointed finger engaging its rounded surface, and means for operating said mechanism to transport the blank from the support to the holder.

HERBERT HASTINGS.

Witnesses:
H. GIBSON,
RUSSELL B. GRIFFITH.